US012744687B2

(12) United States Patent
Huffman et al.

(10) Patent No.: US 12,744,687 B2

(45) Date of Patent: *Sep. 22, 2026

(54) SCORING SYSTEM FOR CONTENT MODERATION

(71) Applicant: Modulate, Inc., Cambridge, MA (US)

(72) Inventors: William Carter Huffman, Cambridge, MA (US); Michael Pappas, Cambridge, MA (US); Ken Morino, Acton, MA (US); David Pickart, Chicago, IL (US)

(73) Assignee: Modulate, Inc., Somerville, MA (US)

( * ) Notice: Subject to any disclaimer, the term of this patent is extended or adjusted under 35 U.S.C. 154(b) by 243 days.

This patent is subject to a terminal disclaimer.

(21) Appl. No.: 18/204,869

(22) Filed: Jun. 1, 2023

(65) Prior Publication Data

US 2023/0395065 A1 Dec. 7, 2023

Related U.S. Application Data

(60) Provisional application No. 63/347,947, filed on Jun. 1, 2022, provisional application No. 63/347,948, filed on Jun. 1, 2022.

(51) Int. Cl.
*G10L 25/63* (2013.01)
*G06F 3/0482* (2013.01)
(Continued)

(52) U.S. Cl.
CPC ........ *H04L 12/1822* (2013.01); *G06F 3/0482* (2013.01); *G06F 3/0484* (2013.01);
(Continued)

(58) Field of Classification Search
CPC ............... H04L 12/1822; H04L 65/403; H04L 12/1831; G06F 3/0482; G06F 3/0484;
(Continued)

(56) References Cited

U.S. PATENT DOCUMENTS 5,327,521 A 7/1994 Savic et al.
5,677,989 A 10/1997 Rabin et al.
(Continued)

FOREIGN PATENT DOCUMENTS

CN 101359473 A 2/2009
CN 102982809 A 3/2013
(Continued)

OTHER PUBLICATIONS

Anderson F Machado et al: "Voice Conversion: a Critical Survey", Jan. 1, 2010, Jan. 1, 2010 (Jan. 1, 2010), pp. 1-8, XP007921050, Retrieved from the Internet: URL:www.ime.usp.br/-mqz/SMC2010Voice.pdf.
(Continued)

*Primary Examiner* — Fariba Sirjani

(74) *Attorney, Agent, or Firm* — Nutter McClennen & Fish LLP

(57) ABSTRACT

A method for online voice content moderation provides a multi-stage voice content analysis system. The system includes a pre-moderator stage having a toxicity scorer configured to provide a toxicity score for a given toxic speech content from a user. The toxicity score is a function of a platform content policy. The method generates a toxicity score for the given toxic speech content. The toxic speech content is provided to a moderator as a function of the toxicity score.

15 Claims, 19 Drawing Sheets

(51) Int. Cl.
*G06F 3/0484* (2022.01)
*G10L 15/08* (2006.01)
*G10L 25/27* (2013.01)
*H04L 12/18* (2006.01)
*H04L 65/403* (2022.01)

(52) U.S. Cl.
CPC .............. *G10L 15/08* (2013.01); *G10L 25/27* (2013.01); *G10L 25/63* (2013.01); *H04L 65/403* (2013.01)

(58) Field of Classification Search
CPC ......... G06F 40/30; G10L 15/08; G10L 25/27; G10L 25/63; G10L 15/26
USPC .......................................................... 704/200
See application file for complete search history.

(56) References Cited

U.S. PATENT DOCUMENTS 5,704,006 A 12/1997 Iwahashi
5,758,023 A 5/1998 Bordeaux
5,808,222 A 9/1998 Yang
6,161,091 A 12/2000 Akamine et al.
6,307,140 B1 10/2001 Iwamoto
6,336,092 B1 1/2002 Gibson et al.
7,117,154 B2 10/2006 Yoshioka et al.
7,412,377 B2 8/2008 Monkowski
7,565,697 B2 7/2009 LeVine et al.
7,590,532 B2 9/2009 Suzuki et al.
7,634,410 B2 12/2009 Lemoine et al.
7,664,645 B2 2/2010 Hain et al.
7,881,944 B2 2/2011 Heller et al.
7,987,244 B1 7/2011 Lewis et al.
8,060,565 B1 11/2011 Swartz
8,121,845 B2 2/2012 Kirby
8,131,550 B2 3/2012 Nurminen et al.
8,156,518 B2 4/2012 O'Hern
8,290,772 B1 10/2012 Cohen et al.
8,473,281 B2 6/2013 Maude et al.
8,831,953 B2 * 9/2014 Vanjani .............. H04N 21/8106 704/9
8,930,183 B2 1/2015 Chun et al.
9,009,052 B2 4/2015 Nakano et al.
9,135,923 B1 9/2015 Chen
9,148,630 B2 9/2015 Morris et al.
9,153,235 B2 10/2015 Zhang et al.
9,183,830 B2 11/2015 Agiomyrgiannakis
9,305,530 B1 4/2016 Durham et al.
9,443,198 B1 * 9/2016 Vitaladevuni ....... G06F 18/2148
9,532,136 B2 12/2016 Uhle et al.
9,589,574 B1 3/2017 Klimanis et al.
9,591,427 B1 3/2017 Lyren et al.
9,800,721 B2 10/2017 Gainsboro et al.
10,046,237 B2 8/2018 Rom et al.
10,186,251 B1 1/2019 Mohammadi
10,198,667 B2 2/2019 Ryan, Jr. et al.
10,357,713 B1 7/2019 Anders et al.
10,361,673 B1 7/2019 Matsukawa
10,453,476 B1 10/2019 Aryal
10,614,826 B2 4/2020 Huffman et al.
10,622,002 B2 4/2020 Huffman et al.
10,706,839 B1 7/2020 Stephenson
10,706,867 B1 7/2020 Villavicencio et al.
10,708,687 B1 7/2020 Gedney et al.
10,807,006 B1 10/2020 Davis et al.
10,912,989 B2 2/2021 Kornmann et al.
10,918,956 B2 2/2021 Rout et al.
10,922,534 B2 * 2/2021 Zavesky ................. A63F 13/34
10,936,817 B2 3/2021 Agarwal et al.
10,940,396 B2 3/2021 Pinto et al.
10,987,592 B1 4/2021 Schaeppi et al.
10,994,209 B2 5/2021 Miyaki
10,997,494 B1 5/2021 Ng et al.
11,010,687 B2 5/2021 Mehdad et al.
11,017,788 B2 5/2021 Huffman et al.
11,056,131 B2 7/2021 Kulavik et al.
11,090,566 B1 8/2021 Chow
11,170,800 B2 11/2021 McAlpine et al.
11,235,248 B1 2/2022 Orrino et al.
11,266,912 B2 3/2022 Dorn et al.
11,278,815 B2 3/2022 Kulavik et al.
11,358,066 B2 6/2022 Hume et al.
11,514,337 B1 * 11/2022 Karpman ............. G06V 10/764
11,538,485 B2 12/2022 Huffman et al.
11,714,967 B1 8/2023 Wu et al.
11,854,563 B2 12/2023 Huffman et al.
11,996,117 B2 * 5/2024 Huffman ................. G10L 15/26
12,341,619 B2 * 6/2025 Huffman ................. G06F 40/30
2001/0044721 A1 11/2001 Yoshioka et al.
2002/0046899 A1 4/2002 Mizuno et al.
2002/0072900 A1 6/2002 Keough et al.
2002/0086653 A1 7/2002 Kim
2002/0116641 A1 * 8/2002 Mastrianni ............ H04L 51/212 726/11
2002/0120854 A1 8/2002 LeVine et al.
2003/0154080 A1 8/2003 Godsey et al.
2003/0158734 A1 8/2003 Cruickshank
2004/0010798 A1 1/2004 Galli et al.
2005/0064374 A1 3/2005 Spector
2005/0108227 A1 5/2005 Russell-Falla et al.
2005/0131680 A1 6/2005 Chazan et al.
2006/0003305 A1 1/2006 Kelmar
2006/0095262 A1 5/2006 Danieli
2006/0210956 A1 9/2006 Okamoto
2006/0268007 A1 11/2006 Gopalakrishnan
2007/0112568 A1 5/2007 Fingscheidt et al.
2008/0034231 A1 2/2008 Ginter et al.
2008/0082320 A1 4/2008 Popa et al.
2008/0177834 A1 * 7/2008 Gruhl ..................... G06Q 10/00 709/204
2008/0201150 A1 8/2008 Tamura et al.
2008/0221882 A1 9/2008 Bundock et al.
2008/0243511 A1 10/2008 Fujita et al.
2008/0255830 A1 10/2008 Rosec et al.
2008/0262838 A1 10/2008 Nurminen et al.
2008/0269633 A1 10/2008 Watson
2008/0319932 A1 * 12/2008 Yih ........................ G06Q 10/06 706/20
2009/0034704 A1 2/2009 Ashbrook et al.
2009/0037179 A1 2/2009 Liu et al.
2009/0055189 A1 2/2009 Stuart et al.
2009/0089063 A1 4/2009 Meng et al.
2009/0094027 A1 4/2009 Nurminen et al.
2009/0177473 A1 7/2009 Aaron et al.
2009/0234831 A1 * 9/2009 Ebadollahi ......... G06Q 30/0201 707/999.005
2010/0049522 A1 2/2010 Tamura et al.
2010/0082326 A1 4/2010 Bangalore et al.
2010/0088089 A1 4/2010 Hardwick
2010/0094620 A1 4/2010 Hardwick
2010/0198600 A1 8/2010 Masuda
2010/0215289 A1 8/2010 Pradeep et al.
2011/0098029 A1 4/2011 Rhoads et al.
2011/0125493 A1 5/2011 Hirose et al.
2011/0161348 A1 6/2011 Oron
2011/0191105 A1 * 8/2011 Spears .................. G06F 40/242 704/251
2011/0218804 A1 9/2011 Chun
2012/0095762 A1 4/2012 Eom et al.
2012/0095767 A1 4/2012 Hirose et al.
2012/0116756 A1 5/2012 Kalinli
2012/0166187 A1 6/2012 Van Buskirk et al.
2012/0253794 A1 10/2012 Chun et al.
2012/0253812 A1 10/2012 Kalinli et al.
2013/0025437 A1 1/2013 Serletic et al.
2013/0080164 A1 3/2013 Zanolin et al.
2013/0144603 A1 6/2013 Lord et al.
2013/0150117 A1 6/2013 Rodriguez et al.
2013/0151256 A1 6/2013 Nakano et al.
2013/0166274 A1 6/2013 Fagundes et al.
2013/0203027 A1 8/2013 De Villers-Sidani et al.
2013/0268273 A1 10/2013 Chen et al.
2013/0311189 A1 11/2013 Villavicencio et al.

(56) References Cited

U.S. PATENT DOCUMENTS

2014/0013221 A1* 1/2014 Zheng .................. G06F 40/166 715/264
2014/0046660 A1 2/2014 Kamdar
2014/0074459 A1 3/2014 Chordia et al.
2014/0088958 A1 3/2014 Chen
2014/0088968 A1 3/2014 Chen
2014/0114655 A1 4/2014 Kalinli-Akbacak
2014/0122081 A1 5/2014 Kaszczuk et al.
2014/0136013 A1 5/2014 Wolverton et al.
2014/0136187 A1 5/2014 Wolverton et al.
2014/0149112 A1 5/2014 Kalinli-Akbacak
2014/0180673 A1 6/2014 Neuhauser et al.
2014/0180675 A1 6/2014 Neuhauser et al.
2014/0195242 A1 7/2014 Chen
2014/0200889 A1 7/2014 Chen
2014/0245329 A1 8/2014 Kato et al.
2014/0274386 A1 9/2014 Ault et al.
2015/0005661 A1 1/2015 Trammell
2015/0025892 A1 1/2015 Lee et al.
2015/0052594 A1 2/2015 Liberman et al.
2015/0058015 A1 2/2015 Mitsufuji et al.
2015/0063573 A1 3/2015 Daly
2015/0070516 A1* 3/2015 Shoemake ......... H04N 21/4542 348/207.11
2015/0110387 A1* 4/2015 Lienhart ............... G06F 18/211 382/159
2015/0127350 A1 5/2015 Agiomyrgiannakis
2015/0161753 A1 6/2015 Blesser
2015/0255074 A1 9/2015 Jeong et al.
2015/0279349 A1 10/2015 Byron et al.
2015/0309987 A1* 10/2015 Epstein .................. G06F 40/30 704/9
2015/0356967 A1 12/2015 Byron et al.
2015/0379752 A1 12/2015 Li et al.
2016/0005403 A1 1/2016 Agiomyrgiannakis et al.
2016/0036961 A1 2/2016 Lee
2016/0111108 A1 4/2016 Erdogan et al.
2016/0196630 A1 7/2016 Blesser
2016/0260425 A1 9/2016 Saino et al.
2016/0294753 A1* 10/2016 Centner ................ H04L 51/212
2016/0300582 A1 10/2016 Vaillancourt et al.
2016/0378427 A1 12/2016 Sharma et al.
2016/0379641 A1 12/2016 Liu et al.
2017/0018270 A1 1/2017 Min
2017/0048176 A1 2/2017 Onusko et al.
2017/0125008 A1 5/2017 Maisonnier et al.
2017/0133005 A1 5/2017 Mason
2017/0142548 A1 5/2017 Buskirk et al.
2017/0149961 A1 5/2017 Kim et al.
2017/0249953 A1 8/2017 Yassa et al.
2018/0040324 A1 2/2018 Wilberding
2018/0053261 A1 2/2018 Hershey
2018/0097841 A1 4/2018 Stolarz et al.
2018/0108370 A1 4/2018 Dow et al.
2018/0137875 A1 5/2018 Liu et al.
2018/0146370 A1 5/2018 Krishnaswamy et al.
2018/0182397 A1 6/2018 Carbune et al.
2018/0225083 A1 8/2018 Barkley et al.
2018/0276710 A1 9/2018 Tietzen et al.
2018/0277113 A1* 9/2018 Hartung .................. G10L 15/30
2018/0316709 A1 11/2018 Purian
2018/0336713 A1 11/2018 Avendano et al.
2018/0342256 A1 11/2018 Huffman et al.
2018/0342257 A1 11/2018 Huffman et al.
2018/0342258 A1 11/2018 Huffman et al.
2019/0013038 A1 1/2019 Thomson et al.
2019/0051276 A1 2/2019 Lathrop et al.
2019/0052471 A1 2/2019 Panattoni et al.
2019/0364126 A1 11/2019 Todd
2019/0378024 A1 12/2019 Singh et al.
2020/0005773 A1 1/2020 Schmidt et al.
2020/0030971 A1 1/2020 Oleynik
2020/0051550 A1* 2/2020 Baker ..................... G10L 21/00
2020/0099640 A1 3/2020 Andre et al.
2020/0125639 A1 4/2020 Doyle
2020/0125928 A1* 4/2020 Doyle .............. G06V 30/19147
2020/0129864 A1 4/2020 Tran et al.
2020/0142999 A1 5/2020 Pedersen
2020/0164278 A1 5/2020 Andre et al.
2020/0187841 A1 6/2020 Ayyad
2020/0219488 A1 7/2020 Bender et al.
2020/0243101 A1 7/2020 Huffman et al.
2020/0267165 A1 8/2020 Leliwa et al.
2020/0314152 A1 10/2020 Andre et al.
2020/0335090 A1 10/2020 Freed et al.
2020/0388287 A1* 12/2020 Anushiravani ......... G10L 17/26
2020/0394724 A1* 12/2020 Agrawal ................ G06F 16/35
2021/0004440 A1 1/2021 Purnell et al.
2021/0019339 A1 1/2021 Ghulati et al.
2021/0050025 A1 2/2021 Huffman et al.
2021/0201893 A1* 7/2021 Lyu ........................ G10L 15/22
2021/0224858 A1 7/2021 Khoury et al.
2021/0234823 A1 7/2021 Evkovitz et al.
2021/0256985 A1 8/2021 Huffman et al.
2021/0322887 A1 10/2021 Schaeppi
2021/0329124 A1 10/2021 Li et al.
2021/0370188 A1 12/2021 Thomas et al.
2021/0390948 A1* 12/2021 Shah ....................... G10L 15/08
2021/0402304 A1 12/2021 Dorn et al.
2022/0008830 A1 1/2022 Valencia
2022/0032199 A1 2/2022 Rudi et al.
2022/0043982 A1 2/2022 Purnell et al.
2022/0059071 A1 2/2022 Pearce et al.
2022/0096937 A1 3/2022 Dorn et al.
2022/0111297 A1 4/2022 Rudi et al.
2022/0115033 A1 4/2022 Huffman et al.
2022/0184502 A1 6/2022 Vogel
2022/0191636 A1* 6/2022 Bharitkar ............... G06N 20/00
2022/0203244 A1 6/2022 Ng et al.
2022/0207421 A1* 6/2022 Fong .................. G06Q 30/0201
2022/0224792 A1 7/2022 Horton et al.
2022/0284884 A1* 9/2022 Tongya ................ G06F 40/242
2023/0016729 A1* 1/2023 Pouran Ben Veyseh .................... G06F 40/30
2023/0245650 A1 8/2023 Cary et al.
2023/0396457 A1* 12/2023 Huffman ............. H04L 12/1822
2024/0012864 A1* 1/2024 Siegel ................. G06F 16/9536
2024/0296858 A1* 9/2024 Huffman .................. G06N 3/08

FOREIGN PATENT DOCUMENTS

CN 107293289 A 10/2017
JP 2006319598 A 11/2006
KR 101665882 B1 10/2016
KR 101666930 B1 10/2016
WO 2018218081 A1 11/2018

OTHER PUBLICATIONS

Arik et al.—"Neural Voice Cloning with a Few Samples," arXiv:1802.06006 [cs.CL], 17 pages, Mar. 20, 2018.

Arjovsky et al.—"Wasserstein GAN," arXiv:1701.07875 [stat.ML], 32 pages, Dec. 6, 2017.

Arora et al., "Real-Time Adaptive Speech Watermarking Scheme for Mobile Applications", Dec. 18, 2003, retrieved on [Nov. 25, 2020]. Retrieved from the internet URL:https://ieeexplore.ieee.org/stamp/stamp.sp?tp=&amumber= 1292641, 5 pages.

De Brébisson et al.—"Create a digital copy of your voice with one minute of audio," Lyrebird, https://lyrebird.ai, 1 page showing URL provided, 2017.

Desai, S., et al., "Spectral Mapping Using Artificial Neural Networks for Voice Conversion," IEEE Transactions on Audio, Speech, and Language Processing, vol. 18, No. 5, Jul. 2010, pp. 954-964.

Extended European Search Report issued by the European Patent Office for European Patent Application No. 18806567.6, dated Jan. 21, 2022.

Goodfellow et al.—"Generative Adversarial Nets," arXiv:1406.2661 [stat.ML], 9 pages, Jun. 10, 2014.

Gulrajani et al.—"Improved Training of Wasserstein GANs," arXiv:1704.00028 [cs.LG], 20 pages, Dec. 25, 2017.

(56) References Cited

OTHER PUBLICATIONS

Hong—"RNN GAN Based General Voice Conversion-Pitch," Youtube, Retrieved from https://www.youtube.com/watch?v=ULWLleBDCEY, 1 page showing URL provided, Jan. 12, 2018.
Hsu et al.—"Voice Conversion from Unaligned Corpora using Variational Autoencoding Wasserstein Generative Adversarial Networks," arXiv:1704.00849 [cs.CL], 5 pages, Jun. 8, 2017.
International Search Report and Written Opinion for International Application No. PCT/US2021/054319, dated Feb. 14, 2022, 18 pages.
International Search Report and Written Opinion for International Application No. PCT/US2018/034485, mailed Sep. 25, 2018, 21 pages.
International Search Report and Written Opinion for International Application No. PCT/US2020/046534, dated Jan. 5, 2021, 23 pages.
International Search Report and Written Opinion for International Application No. PCT/US23/17930, mailed Aug. 11, 2023, 7 pages.
International Search Report and Written Opinion for International Application No. PCT/US23/24193, mailed Oct. 24, 2023, 12 pages.
Kaneko et al.—"Parallel-Data-Free Voice Conversion Using Cycle-Consistent Adversarial Networks," arXiv:1711.11293 [stat.ML], 5 pages, Dec. 20, 2017.
Kaneko et al.—"Sequence-to-Sequence Voice Conversion with Similarity Metric Learned Using Generative Adversarial Networks," INTERSPEECH 2017, pp. 1283-1287, Aug. 2017.
Lorenzo-Trueba et al.—"Can we steal your vocal identity from the Internet?: Initial investigation of cloning Obama's voice using GAN, WaveNet and low-quality found data," arXiv:1803.00860 [eess.AS], 8 pages, Mar. 2, 2018.
Machado, A., et al. "Voice Conversion: A Critical Survey," retrieved from https://www.ime.usp.br/~mqz/SMC2010_Voice.pdf, pp. 291-298, published in 2010.
Ming Huaiping et al: "Exemplar-based sparse representation of timbre and prosody for voice conversion", 2016 IEEE International Conference on Acoustics, Speech and Signal Processing (ICASSP), IEEE, Mar. 20, 2016 (Mar. 20, 2016), pp. 5175-5179, XP032901590, DOI: 10.1109/ICASSP.2016.7472664 [retrieved on May 18, 2016] *D2, p. 1, left column, lines 6-9 of the introduction *.
Mobin et al.—"Voice Conversion using Convolutional Neural Networks," 2016 Machine Learning Summer School, Abstract, 6 pages (Sep. 2018).
Nachmani et al.—"Fitting New Speakers Based on a Short Untranscribed Sample," arXiv:1802.06984 [cs.LG], 9 pages, Feb. 20, 2018.
Oyamada et. al.—"Non-native speech conversion with consistency-aware recursive network and generative adversarial network," Proceedings of APSIPA Annual Summit and Conference, 7 pages, Dec. 2017.
Salimans et al.—"Improved Techniques for Training GANs," arXiv:1606.03498 [cs.LG], 10 pages, Jun. 10, 2016.
Srinivas Desai et al: "Spectral Mapping Using Artificial Neural Networks for Voice Conversion", IEEE Transactions on Audio, Speech and Language Processing, IEEE, US, vol. 18, No. 5, Jul. 1, 2010 (Jul. 1, 2010), pp. 954-964, XP011329177, ISSN: 1558-7916, DOI: 10.1109/TASL.2010.2047683 *Section II-A, II-B * * abstract *.
European Patent Office, Partial Supplementary European Search Report for European Patent Application No. 21878682.0, dated Sep. 10, 2024, 12 pages.

* cited by examiner

SCORING SYSTEM FOR CONTENT MODERATION

CROSS-REFERENCE TO RELATED APPLICATIONS

This patent application claims priority from provisional U.S. patent application No. 63/347,947, filed Jun. 1, 2022, entitled, "SCORING SYSTEM FOR CONTENT MODERATION," and provisional U.S. patent application No. 63/347,948, filed Jun. 1, 2022, entitled, "USER INTERFACE FOR CONTENT MODERATION," both of which are incorporated herein, in their entireties, by reference.

The present application is related to U.S. patent application Ser. No. 17/497,862, filed on Oct. 8, 2021, entitled MULTI-ADAPTIVE SYSTEM FOR CONTENT MODERATION, and naming William Carter Huffman, Michael Pappas, and Henry Howie as inventors, which claims priority to U.S. Provisional Patent Application No. 63/089,226, filed Oct. 8, 2020, both of which are incorporated herein, in their entireties, by reference.

FIELD OF THE INVENTION

Illustrative embodiments of the invention generally relate to moderation of content and, more particularly, the various embodiments of the invention relate to moderating voice content in an online environment.

BACKGROUND OF THE INVENTION

Large multi-user platforms that allow communication between users, such as Reddit, Facebook, and video games, encounter problems with toxicity and disruptive behavior, where some users can harass, offend, or demean others, discouraging them from participating on the platform. Disruptive behavior is typically done through text, speech, or video media; such as verbally harassing another user in voice chat, or posting an offensive video or article. Disruptive behavior can also be through intentionally sabotaging team-based activities, such as one player of a team game intentionally underperforming in order to upset their teammates. These actions affect the users and the platform itself: users encountering disruptive behavior may be less likely to engage with the platform, or for shorter periods of time; and sufficiently egregious behavior may cause users to abandon the platform outright.

Platforms can directly counter disruptive behavior through content moderation, which observes users of the platform and takes action when disruptive content is found. Reactions can be direct, such as temporarily or permanently banning users who harass others; or subtle, such as grouping together toxic users in the same circles, leaving the rest of the platform clean. Traditional content moderation systems fall into two camps:

those that are highly automated but easy to circumvent and only exist in certain domains, and those that are accurate but highly manual, slow, and expensive.

SUMMARY OF VARIOUS EMBODIMENTS

In accordance with one embodiment of the invention, a method for online voice content moderation provides a multi-stage voice content analysis system. The system includes a pre-moderator stage having a toxicity scorer configured to provide a toxicity score for a given toxic speech content from a user. The toxicity score is a function of a platform content policy. The method generates a toxicity score for the given toxic speech content. The toxic speech content is provided to a moderator as a function of the toxicity score.

In some embodiments, the toxic speech content may be a speech clip of a given length. In some other embodiments, the toxic speech content may be an isolated speech clip. The isolated speech clip may be identified by a beginning pause in speech and an ending pausing in speech. The pause may be for a given duration of time.

In various embodiments, the method receives feedback from the moderator regarding whether the toxic speech content is considered toxic by the moderator. The method may set a toxicity score threshold for automatic moderator action Thus, the method may automatically provide moderator action for the toxic user when the toxicity score of the toxic speech content is above the toxicity score threshold.

Some embodiments provide a subset of the toxic speech content to the moderator as a function of the toxicity score. The subset of the toxic speech content provided to the moderator may have an associated toxicity score that is below the threshold toxicity score. The method may further update the toxicity score for the subset of the toxic speech content as a function of the received feedback from the moderator. An accuracy of the subset of the toxic speech content may be determined. The method may also adjust a toxicity score threshold for automatic moderator action based on the accuracy. Adjusting the toxicity score threshold includes reducing the toxicity score threshold.

In various embodiments, a machine learning system is trained to generate a toxicity score using a toxicity score dataset. The toxicity score dataset may include an adult language component, an audio assault component, a violent speech component, a racial hate speech component, and/or a gender hate speech component. The toxicity score dataset may include an emotion component, a user context component, and/or an age component. In some embodiments, the toxicity score is provided for each type of toxicity of a speech clip. In some other embodiments, the toxicity score is provided as an overall toxicity score for the speech clip.

In accordance with another embodiment, a multi-stage content analysis system includes a first stage trained using a database having training data with positive and/or negative examples of training content for the first stage. The first stage is configured to receive speech content, and to analyze the speech content to categorize the speech content as having first-stage positive speech content and/or first-stage negative speech content. The system also includes a pre-moderator stage configured to receive at least a portion, but less than all, of the first-stage negative speech content. The pre-moderator stage is further configured to analyze the first-stage positive speech content to categorize the first-stage positive speech content as having pre-moderator-stage positive speech content and/or pre-moderator-stage negative speech content. The pre-moderator stage further configured to update the database using the pre-moderator-stage positive speech content and/or the pre-moderator-stage negative speech content. The pre-moderator stage includes a toxicity scorer configured to provide a toxicity score for the pre-moderator-stage positive speech content. The system also includes a user interface configured to display the toxicity score for the pre-moderator-stage positive speech content as a function of the toxicity score.

In some embodiments, the system includes an automatic action threshold setter configured to set a toxicity score threshold above which toxic speech content is automatically moderated. The system may also include an input configured to receive feedback from a moderator. The feedback indicates whether the pre-moderator-stage positive speech content is considered toxic or not in accordance with community guidelines.

In various embodiments, the pre-moderator stage is configured to provide pre-moderator-stage positive speech content to the moderator that is below the toxicity score threshold. Furthermore, the automatic action threshold setter is configured to adjust the toxicity score threshold as a function of the accuracy of the toxicity scores after the pre-moderator stage training is updated using feedback received from a moderator.

In accordance with another embodiment, a method moderates online voice content moderation. The method provides a multi-stage voice content analysis system. The system has a pre-moderator stage having a toxicity scorer configured to provide a raw toxicity score for a plurality of toxicity categories for a given toxic speech content from a user. The method generates a weighted toxicity score for the plurality of toxicity categories for the given toxic speech content as a function of the raw toxicity score and weighting factors from a platform content policy. The method determines the maximum weighted toxicity score and the associated toxicity category. The toxic speech content is provided to a moderator with an indication of the maximum weighted toxicity score and the associated toxicity category.

Among other things, the plurality of toxicity categories may include adult language, audio assault, violent speech, racial/cultural hate speech, gender/sexual hate speech, sexual harassment, misrepresentations, manipulations, and/or bullying. The content policy may be received by a manual user entry and/or by answering a questionnaire. The content policy provides a set of statistical weights that are applied to the raw scores for each toxicity category.

The method may receive feedback from a moderator regarding whether the provided toxic speech content is properly or improperly identified as toxic speech and/or in an appropriate toxicity category. The received feedback may be used to adjust the weighting factors of the platform content policy.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

It should be noted that the foregoing figures and the elements depicted therein are not necessarily drawn to consistent scale or to any scale. Unless the context otherwise suggests, like elements are indicated by like numerals. The drawings are primarily for illustrative purposes and are not intended to limit the scope of the inventive subject matter described herein.

DESCRIPTION OF ILLUSTRATIVE EMBODIMENTS

In illustrative embodiments, a content moderation system analyzes speech, or characteristics thereof, and determines the likelihood that the speech is toxic. A pre-moderator stage is configured to provide a toxicity score for one or more speech clips within a speech session. The toxic speech content, along with an associated toxicity score, is provided to a moderator. Accordingly, the moderator may review the most likely toxic speech content based on the toxicity score. In some embodiments, automated moderator action may be taken by the system for toxic speech content that is above a threshold toxicity score.

Figure 1:
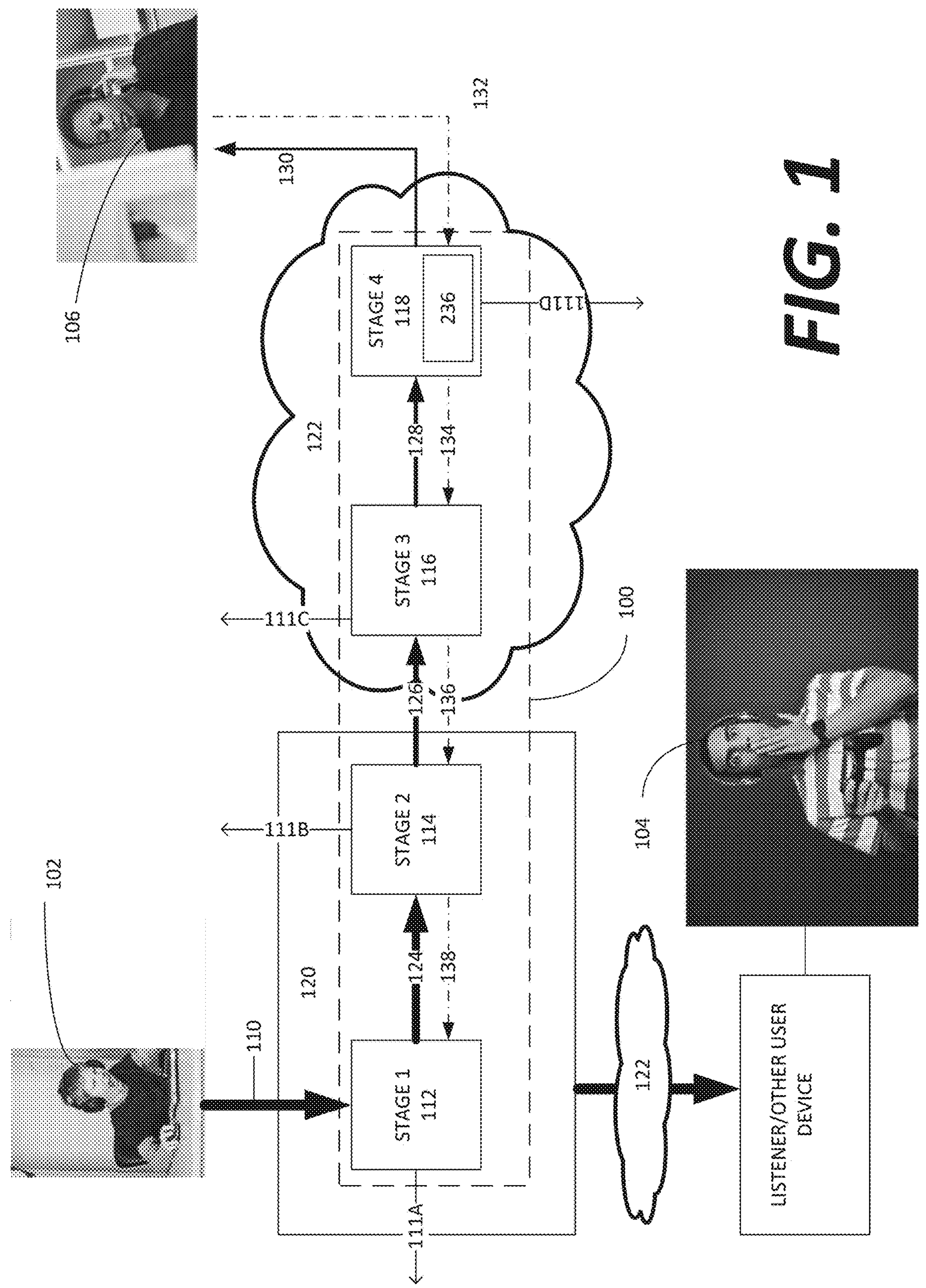
FIG. 1 schematically shows a system for content moderation in accordance with illustrative embodiments of the invention.

FIG. 1 schematically shows a system 100 for content moderation in accordance with illustrative embodiments of the invention. The system 100 described with reference to FIG. 1 moderates voice content, but those of skill in the art will understand that various embodiments may be modified to moderate other types of content (e.g., media, text, etc.) in a similar manner. Additionally, or alternatively, the system 100 may assist a human moderator 106 by identifying speech 110 that is most likely to be toxic. The system 100 has applications in a variety of settings, but in particular, may be useful for video game voice chat moderation. Global revenue for the video game industry is thriving with large year-over-year increases. The expected increase is due in part to the addition of new gamers (i.e., users) to video games, which increasingly offer voice chat as an in-game option. Many other voice chat options exist outside of gaming as well. While voice chat is a desirable feature in many online platforms and video games, user safety is an important consideration. The prevalence of online toxicity via harassment, racism, sexism, and other types of toxicity are detrimental to the users' online experience, and may lead to decline in voice chat usage and/or safety concerns. Thus, there is a need for a system 100 that can efficiently (i.e., cost and time) determine toxic speech content (e.g., racism, sexism, other bullying) from a large pool of content (e.g., all voice chat communications in a video game).

To that end, the system 100 interfaces between a number of users, such as a speaker 102, a listener 104, and a moderator 106. The speaker 102, the listener 104, and the moderator 106 may be communicating over a network 122 provided by a given platform, such as Fortnite, Call of Duty, Roblox, Halo; streaming platforms such as YouTube and Twitch, and other social apps such as Discord, WhatsApp, Clubhouse, dating platforms, etc.

For ease of discussion, FIG. 1 shows speech 110 flowing in a single direction (i.e., towards the listener 104 and the moderator 106). In practice, the listener 104 and/or the moderator 106 may be in bi-directional communication (i.e., the listener 104 and/or the moderator 106 may also be speaking with the speaker 102). For the sake of describing the operation of the system 100, however, a single speaker 102 is used as an example. Furthermore, there may be multiple listeners 104, some or all of which may also be speakers 102 (e.g., in the context of a video game voice chat, where all participants are both speakers 102 and listeners 104). In various embodiments, the system 100 operates in a similar manner with each speaker 102.

Additionally, information from other speakers 102 may be combined and used when judging the toxicity of speech from a given speaker—for example, one participant A might insult another participant B, and participant B might defend themself using vulgar language. Based on the context of the interaction and the content of the speech, the system may determine that user A is toxic while user B is not toxic (i.e., the speech of user B is not toxic because their language is used in self-defense). Alternatively, the system 100 may determine that both users are being toxic. This information is consumed by inputting it into one or more of the stages of the system 100—typically later stages that do more complex processing, but it could be any or all stages.

For ease of reference, this application may refer to both speakers 102 and listeners 104 collectively as users 102 or players 102. Frequently, voice communication is bi-directional, such that the speaker 102 may also, but does not necessarily, become the listener 104, and vice-versa. Various embodiments provide the moderator 106 with a conversational style view of a toxic voice chat session. Thus, the reference numeral 102 may be used with reference to users 102 or players 102, with the understanding that these users 102 or players 102 may become the speaker 102 (but do not necessarily have to become the speaker 102) at various points throughout the conversation.

In various embodiments, the system 100 includes a plurality of stages 112-118 each configured to determine whether the speech 110, or a representation thereof, is likely to be considered toxic (e.g., in accordance with a company policy that defines "toxicity"). In various embodiments, the stage is a logical or abstract entity defined by its interface: it has an input (some speech or representation thereof) and two outputs (filtered speech and discarded speech) (however, it may or may not have additional inputs—such as session context, or additional outputs—such as speaker age estimates), and it receives feedback from later stages (and may also provide feedback to earlier stages). These stages are, of course, physically implemented—so they're typically software/code (individual programs, implementing logic such as Digital Signal Processing, Neural Networks, etc.—or combinations of these), running on hardware such as general purposes computers (CPU, or GPU). However, they could be implemented as FPGAs, ASICs, analog circuits, etc. Typically, the stage has one or more algorithms, running on the same or adjacent hardware. For example, one stage may be a keyword detector running on the speaker's computer. Another stage may be a transcription engine running on a GPU, followed by some transcription interpretation logic running on a CPU in the same computer. Or a stage may be multiple neural networks whose outputs are combined at the end to do the filtering, which run on different computers but in the same cloud (such as AWS).

One or more of the stages 112-118 may include a toxicity scorer 236. Advantageously, various embodiments may improve efficiency by including the toxicity scorer 236 in the final pre-moderator stage 118, such that the most likely to be toxic speech content is scored. However, various embodiments may include the toxicity scorer 236 in any of the previous stages.

For the sake of clarity, various embodiments may refer to user speech, or analysis thereof. Although the term "speech" is used, it should be understood that the system does not necessarily directly receive or "hear" the speech in real time, nor is the receipt in real time. When a particular stage receives "speech," that "speech" may include some or all of the previous "speech," and/or data representing that speech or portions thereof. The data representing the speech may be encoded in a variety of ways—it could be raw audio samples represented in ways such as Pulse Code Modulate (PCM), for example Linear Pulse Code Modulation or encoded via A-law or u-law quantization. The speech may also be in other forms than raw audio, such as represented in spectrograms, Mel-Frequency Cepstrum Coefficients, Cochleograms, or other representations of speech produced by signal processing. The speech may be filtered (such as bandpassed, or compressed). The speech data may be presented in additional forms of data derived from the speech, such frequency peaks and amplitudes, distributions over phonemes, or abstract vector representations produced by neural networks. The data could be uncompressed, or input in a variety of lossless formats (such as FLAC or WAVE) or lossy formats (such as MP3 or Opus); or in the case of other representations of the speech be input as image data (PNG, JPEG, etc.), or encoded in custom binary formats. Therefore, while the term "speech" is used, it should be understood that this is not limited to a human understandable or audible audio file. Furthermore, some embodiments may use other types of media, such as images or videos.

Automated moderation occurs primarily in text-based media, such as social media posts or text chat in multiplayer video games. Its basic form typically includes a blacklist of banned words or phrases that are matched against the text content of the media. If a match is found, the matching words may be censored, or the writer disciplined. The systems may employ fuzzy matching techniques to circumvent simple evasion techniques, e.g., users replacing letters with similarly-shaped numbers, or omitting vowels. While scalable and cost efficient, traditional automated moderation is generally considered relatively easy to bypass with minimal creativity, is insufficiently sophisticated to detect disruptive behavior beyond the use of simple keywords or short phrases, and is difficult to adapt to new communities or platforms—or to adapt to the evolving terminology and communication styles of existing communities. Some examples of traditional automated moderation exist in moderating illegal videos and images, or illegal uses of copyrighted material. In these cases, the media often is hashed to provide a compact representation of its content, creating a blacklist of hashes; new content is then hashed and checked against the blacklist.

Manual moderation, by contrast, generally employs teams of humans who consume a portion of the content communicated on the platform, and then decide whether the content is in violation of the platform's policies. The teams typically can only supervise several orders of magnitude less content than is communicated on the platform. Therefore, a selection mechanism is employed to determine what content the teams should examine. Typically this is done through user reports, where users consuming content can flag other users for participating in disruptive behavior. The content communicated between the users is put into a queue to be examined by the human moderators, who make a judgment based on the context of the communication and apply punitive action.

Manual moderation presents additional problems. Humans are expensive to employ and the moderation teams are small, so only a small fraction of the platform content is manually determined to be safe to consume, forcing the platform to permit most content unmoderated by default. Queues for reported content are easily overwhelmed, especially via hostile action—coordinated users can either all participate in disruptive behavior simultaneously, overloading the moderation teams; or said users can all report benign content, rendering the selection process ineffective. Human moderation is also time consuming—the human must receive the content, understand it, then react—rendering low-latency actions such as censoring impossible on high-content-volume platforms; a problem which is extended by selection queues which can saturate, delaying action while the queues are handled. Moderation also takes a toll on the human teams—members of the teams are directly exposed to large quantities of offensive content and may be emotionally affected by it; and the high cost of maintaining such teams can lead to team members working long hours and having little access to resources to help them cope.

Current content moderation systems known to the inventors are either too simple to effectively prevent disruptive behavior or too expensive to scale to large amounts of content. These systems are slow to adapt to changing environments or new platforms. Sophisticated systems, beyond being expensive, typically have large latencies between content being communicated and being moderated, rendering real-time reaction or censoring highly difficult at scale.

In general, the moderator 106 is limited by the amount of speech that they can review in a single day. For example, if a moderator can only look at 100 moderation items in a day, various embodiment optimize for the best chance that those 100 moderation items violate the community guidelines of the platform. Various embodiments provide a system that determines a confidence that the speech is a violation of the content policy, but may also account for egregiousness. The more egregious, the more the system 100 is trained to believe that when a moderator reviews the speech it will be considered a violation of the content policy. The system 100 scores the severe/egregious content higher on the toxicity score because it is more likely that the moderator 106 considers that item to be toxic.

Illustrative embodiments provide a number of advantages. For example, for users who are particularly egregious, the system 100 takes action more quickly to improve the overall experience for other users. Less egregious items don't individually rise to the top of the moderation queue, or get automatically moderated (because individually they are below threshold). If a single user creates multiple less egregious items, however, the system may rank them as increasingly severe because they represent a pattern of (less egregious but still important) toxicity, until either the player stops or it does get a sufficiently high toxicity score. In this way, less egregious items may take longer to have action taken on them. Thus, while the system 100 may provide discrete toxicity scores for individual speech clips, the score accounts for context around the session and the user (e.g., including previous scores for other discrete clips).

Figure 2A:
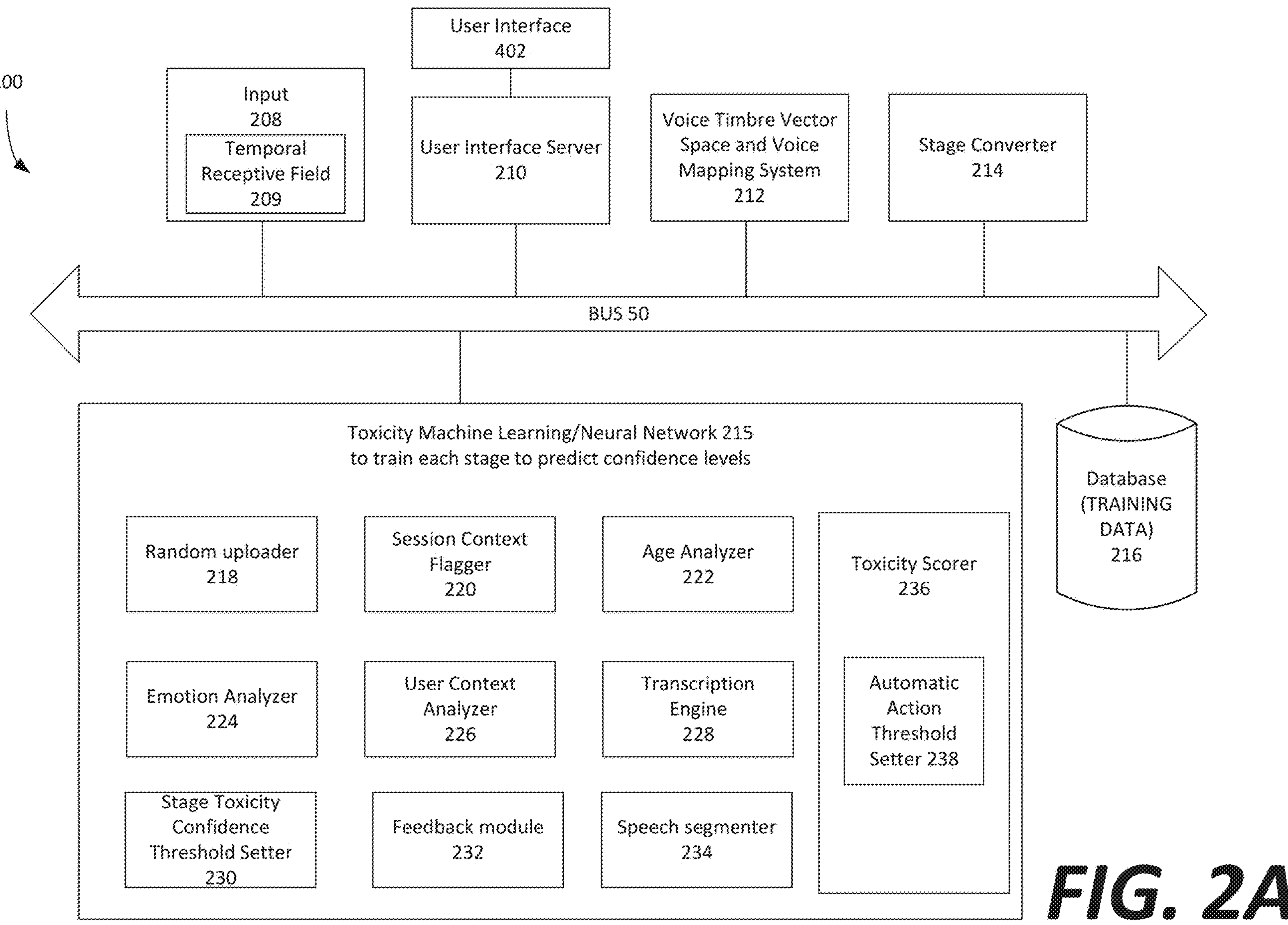
FIGS. 2A-2C schematically shows details of the content moderation system in accordance with illustrative embodiments of the invention.
Figure 2B:
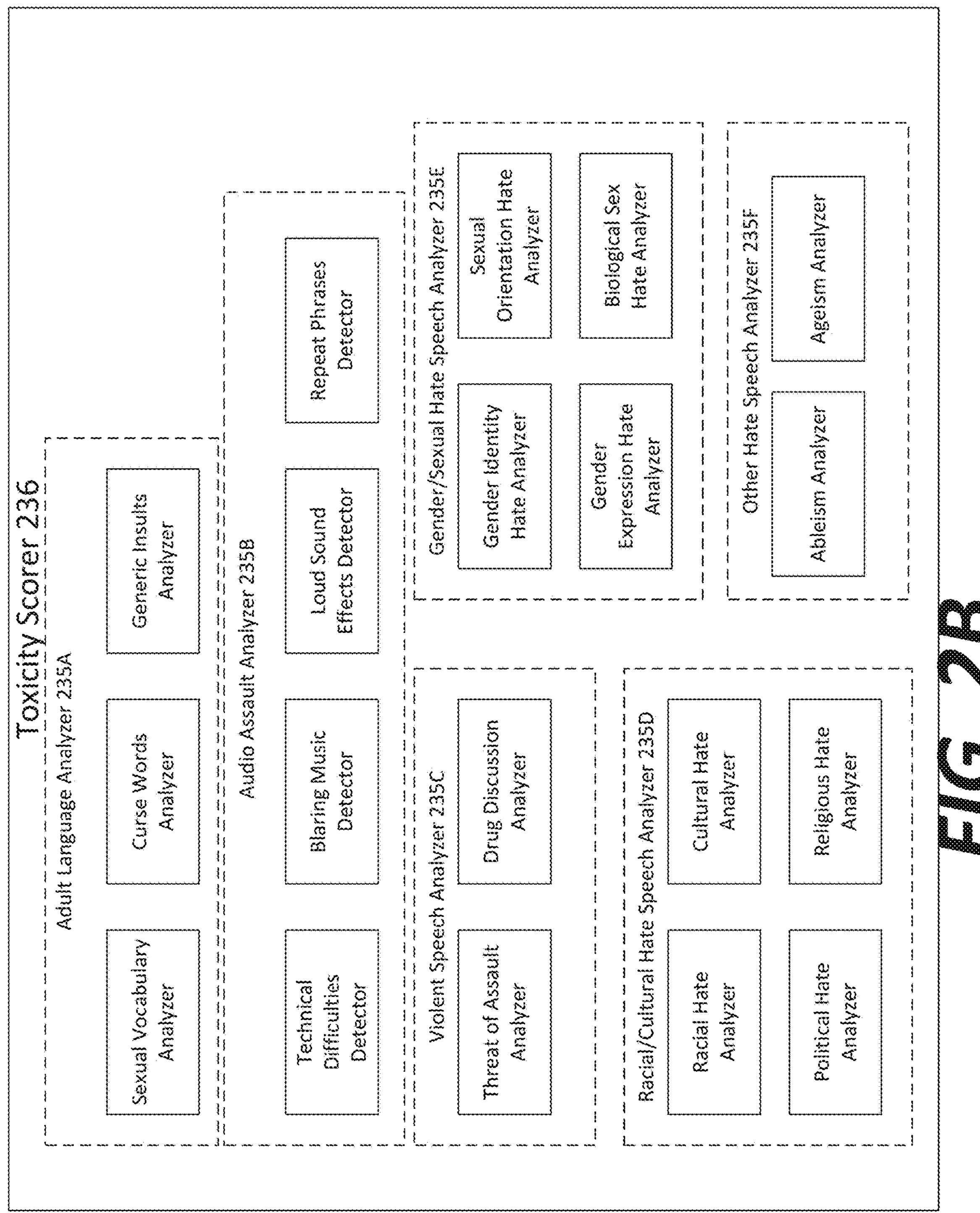
Figure 2C:
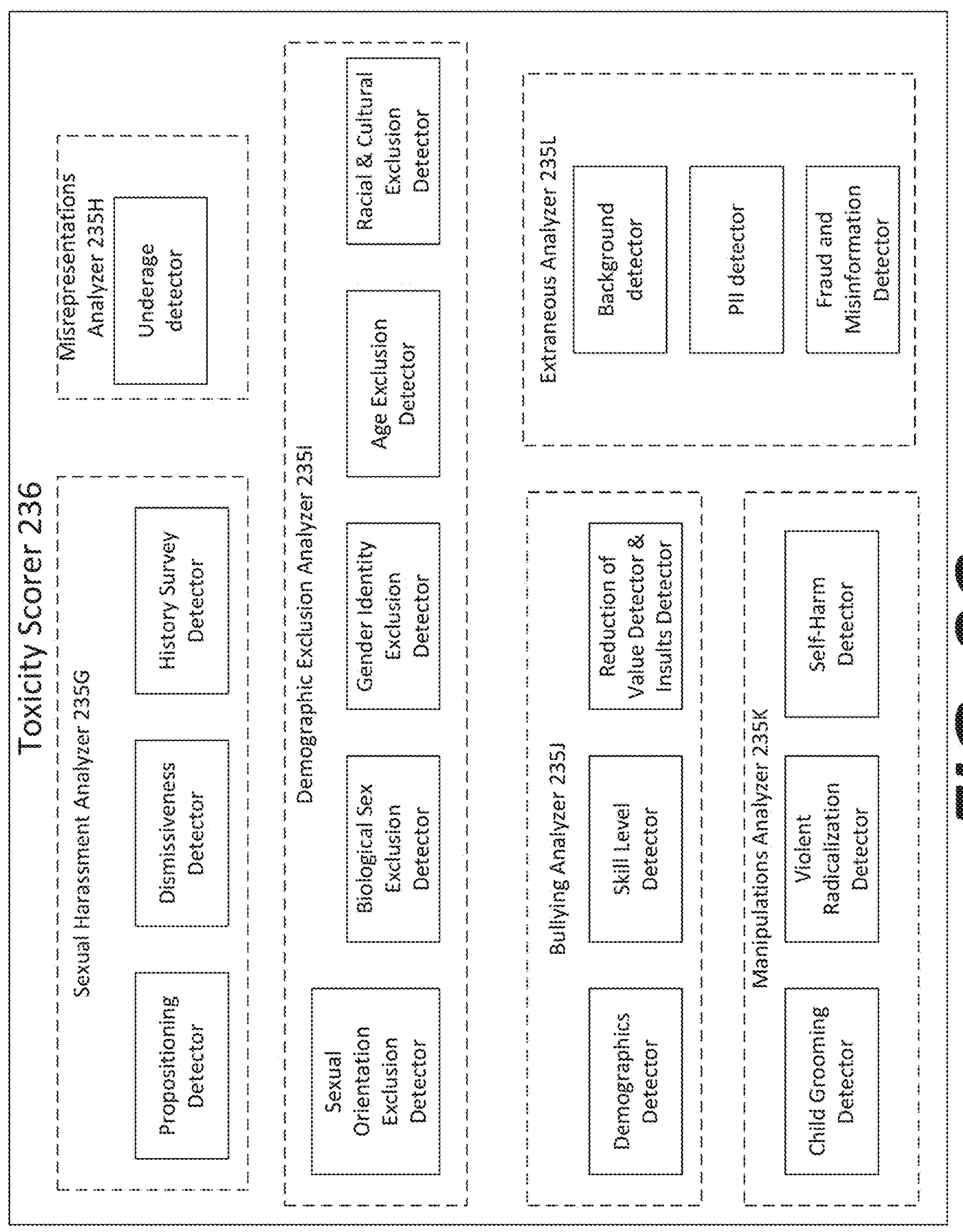

FIGS. 2A-2C schematically shows details of the voice moderation system 100 in accordance with illustrative embodiments of the invention. FIGS. 2B-2C schematically shows further details of the toxicity scorer 236 in accordance with illustrative embodiments of the invention. The system 100 has an input 208 configured to receive the speech 110 (e.g., as an audio file) from the speaker 102 and/or the speaker device 120. It should be understood that reference to the speech 110 includes audio files, but also other digital representations of the speech 110. The input includes a temporal receptive field 209 configured to break the speech 110 into speech chunks. In various embodiments, a machine learning 215 determines whether the entire speech 110 and/or the speech chunks contain toxic speech.

The system also has a stage converter 214, configured to receive the speech 110 and convert the speech in a meaningful way that is interpretable by the stage 112-118. Furthermore, the stage converter 214 allows communication between stages 112-118 by converting filtered speech 124, 126, 128 in such a way that the respective stages 114, 116, and 118 are able to receive to the filtered speech 124, 126, or 128 and analyze the speech.

The system 100 has a user interface server 210 configured to provide a user interface 402 through which the moderator 106 may communicate with the system 100. In various embodiments, the moderator 106 may listen to (or read a transcript of) the speech 130 determined to be toxic by the system 100. Furthermore, the moderator 106 may provide feedback through the user interface regarding whether the toxic speech 130 is determined to be toxic or not. This feedback may be used to retrain the toxicity scorer 236. The moderator 106 may access the user interface via an electronic device (such as a computer, smartphone, etc.), and use the electronic device to provide the feedback to the final stage 118 (e.g., in a session view, described further below). In some embodiments, the electronic device may be a networked device, such as an internet-connected smartphone or desktop computer.

The input 208 is also configured to receive the speaker 102 voice and map the speaker 102 voice in a database of voices, also referred to as a timbre vector space 212. In various embodiments, the timbre vector space 212 may also include a voice mapping system. The timbre vector space 212 and voice mapping system were previously invented by the present inventors and described, among other places, in U.S. Pat. No. 10,861,476, which is incorporated herein by reference in its entirety. The timbre vector space 212 is a multi-dimensional discrete or continuous vector space that represents encoded voice data. The representation is referred to as "mapping" the voices. When the encoded voice data is mapped, the vector space 212 makes characterizations about the voices and places them relative to one another on that basis. For example, part of the representation may have to do with pitch of the voice, or gender of the speaker. The timbre vector space 212 maps voices relative to one another, such that mathematical operations may be performed on the voice encoding, and also that qualitative and/or quantitative information may be obtained from the voice (e.g., identity, sex, race, age, of the speaker 102). It should be understood however that various embodiments do not require the entire timbre mapping component/the timbre vector space 212. Instead, information may be extracted, such as sex/race/age/etc. independently via a separate neural network or other system.

The system 100 also includes a toxicity machine learning 215 configured to determine a likelihood (i.e., a confidence interval), for each stage, that the speech 110 contains toxicity. The toxicity machine learning 215 operates for each stage 112-118. For example, the toxicity machine learning 215 may determine, for a given amount of speech 110, that there is a 60% confidence of toxic speech at the first stage 112, and that there is a 30% confidence of toxic speech at the second stage 114. Illustrative embodiments may include separate toxicity machine learning 215 for each of the stages 112-118. However, for the sake of convenience, various components of the toxicity machine learning 215 that may be distributed throughout various stages 112-118 are shown as being within a single toxicity machine learning component 215. In various embodiments, the toxicity machine learning 215 may be one or more neural networks. The toxicity machine learning 215 for each stage 112-118 is trained to detect toxic speech 110. To that end, the machine learning 215 communicates with a training database 216 having relevant training data therein. The training data in the database 216 may include a library of speech that has been classified by a trained human operator as being toxic and/or not toxic. The training data in the database 216 may be updated using real feedback from the moderator.

The toxicity machine learning 215 has a speech segmenter 234 configured to segment the received speech 110 and/or chunks 110A into segments, which are then analyzed. These segments are referred to as analytical segments of the speech 110. For example, the speaker 102 may provide a total of 1 minute of speech 110. The segmenter 234 may segment the speech 110 into three 20-second intervals, each of which are analyzed independently by the stages 112-118. Furthermore, the segmenter 234 may be configured to segment the speech 110 into different length segments for different stages 112-118 (e.g., two 30-second segments for the first stage, three 20-second segments for the second stage, four 15-second segments for the third stage, five 10-second segments for the fifth stage). Furthermore, the segmenter 234 may segment the speech 110 into overlapping intervals (or non-overlapping intervals). For example, a 30-second segment of the speech 110 may be segmented into five segments (e.g., 0-seconds to 10-seconds, 5-seconds to 15-seconds, 10-seconds to 20-seconds, 15-seconds to 25-seconds, 20-seconds to 30-seconds). Each of the individual segments may be provided with a separate toxicity score by the toxicity scorer.

In some embodiments, the segmenter 234 may segment later stages into longer segments than earlier stages. For example, a subsequent stage 112 may want to combine previous clips to get broader context. The segmenter 234 may accumulate multiple clips to gain additional context and then pass the entire clip through. This could be dynamic as well—for example, accumulate speech in a clip until a region of silence (say, 2-seconds or more), and then pass on that accumulated clip all at once. In that case, even though the clips were input as separate, individual clips, the system would treat the accumulated clip as a single clip from then on (so make one decision on filtering or discarding the speech, for example).

The machine learning 215 may include an uploader 218 (which may be a random uploader) configured to upload or pass through a small percentage of discarded speech 111 from each stage 112-118. The random uploader 218 serves as one layer of quality assurance for the machine learning 215 (e.g., by determining a false negative rate). In other words, if the first stage 112 discards speech 111A, a small portion of that speech 111A is taken by the random uploader 218 and sent to the second stage 114 for analysis. The second stage 114 can therefore determine if the discarded speech 111A was in fact correctly or incorrectly identified as non-toxic (i.e., a false negative, or a true negative for likely to be toxic). This process can be repeated for each stage (e.g., discarded speech 111B is analyzed by the third stage 116, discarded speech 111C is analyzed by the fourth stage, and discarded speech 111D is analyzed by the moderator 106).

Various embodiments efficiently minimize the amount of speech uploaded/analyzed by higher stages 114-118 and/or the moderator 106. To that end, various embodiments sample only a small percentage of the discarded speech 111, such as less than 1% of the discarded speech 111, or preferably, less than 0.1% of the discarded speech 111. The inventors believe that this small sample rate of discarded speech 111 advantageously trains the system 100 to reduce false negatives without overburdening the system 100. Accordingly, the system 100 efficiently checks for the status of false negatives (by minimizing the amount of information that is checked), and improves the false negative rate over time. This is significant, as an efficient toxicity moderation system advantageously correctly identifies speech that is toxic, but also does not miss speech that is toxic (i.e., does not misidentify speech that is toxic). A toxicity confidence threshold setter 230 is configured to set a threshold confidence for toxicity likelihood for each stage 112-118. As described previously, each stage 112-118 is configured to determine/output a confidence of toxicity. That confidence is used to determine whether the speech 110 segment should be discarded 111, or filtered and passed on to a subsequent stage. In various embodiments, the confidence is compared to a threshold that is adjustable by the toxicity confidence threshold setter 230. The toxicity confidence threshold setter 230 may be adjusted automatically by training with a neural network over time to increase the threshold as false negatives and/or false positives decrease. Alternatively, or additionally, the toxicity confidence threshold setter 230 may be adjusted by the moderator 106 via the user interface 402.

The machine learning 215 may also include a session context flagger 220. The session context flagger 220 is configured to communicate with the various stages 112-118 and to provide an indication (a session context flag) to one or more stages 112-118 that previous toxic speech was determined by another stage 112-118. In various embodiments, the previous indication may be session or time limited (e.g., toxic speech 130 determined by the final stage 118 within the last 15 minutes). In some embodiments, the session context flagger 220 may be configured to receive the flag only from subsequent stages or a particular stage (such as the final stage 118).

The machine learning 215 may also include an age analyzer 222 configured to determine an age of the speaker 102 and/or the listener(s) 104. The age analyzer 222 may be provided a training data set of various speakers paired to speaker ages. Accordingly, the age analyzer 222 may analyze the speech 110 to determine an approximate age of the speaker 102. The approximate age of the speaker 102 may be used to adjust the toxicity threshold for a particular stage by communicating with the toxicity confidence threshold setter 230 (e.g., a teenager may lower the threshold because they are considered to be more likely to be toxic). The approximate age of the listener(s) 104 may be used to adjust the toxicity threshold for a particular stage by communicating with the toxicity confidence threshold setter 230 (e.g., a child listener 104 may lower the threshold because they are at higher risk). Additionally, or alternatively, the speaker's 102 or listener's 104 voice may be mapped in the voice timbre vector space 212, and their age may be approximated from there.

An emotion analyzer 224 may be configured to determine an emotional state of the speaker 102. The emotion analyzer 224 may be provided a training data set of various speakers paired to emotion. Accordingly, the emotion analyzer 224 may analyze the speech 110 to determine an emotion of the speaker 102. The emotion of the speaker 102 may be used to adjust the toxicity threshold for a particular stage by communicating with the toxicity confidence threshold setter. For example, an angry speaker may lower the threshold because they are considered more likely to be toxic.

A user context analyzer 226 may be configured to determine a context in which the speaker 102 provides the speech 110. The context analyzer 226 may be provided access to a particular speaker's 102 account information (e.g., by the platform or video game where the speaker 102 is subscribed). This account information may include, among other things, the user's age, the user's geographic region, the user's friends list, history of recently interacted users, and other activity history. Furthermore, where applicable in the video game context, the user's game history, including gameplay time, length of game, time at beginning of game and end of game, as well as, where applicable, recent inter-user activities, such as deaths or kills (e.g., in a shooter game).

For example, the user's geographic region may be used to assist with language analysis, so as not to confuse benign language in one language that sounds like toxic speech in another language. Furthermore, the user context analyzer 226 may adjust the toxicity threshold by communicating with the threshold setter 230. For example, for speech 110 in a communication with someone on a user's friend's list, the threshold for toxicity may be increased (e.g., offensive speech may be said in a more joking manner to friends). As another example, a recent death in the video game, or a low overall team score may be used to adjust the threshold for toxicity downwardly (e.g., if the speaker 102 is losing the game, they may be more likely to be toxic). As yet a further example, the time of day of the speech 110 may be used to adjust the toxicity threshold (e.g., speech 110 at 3 AM may be more likely to be toxic than speech 110 at 5 PM, and therefore the threshold for toxic speech is reduced).

The machine learning 216 includes a toxicity scorer 236 configured to receive policy guidelines for various platforms. The policy guidelines describe what kind of language is or is not appropriate for use on the platform. For example, policy guidelines for a particular platform (e.g., Call of Duty) may vary from the policy guidelines for another platform (e.g., Roblox). The policy guidelines may be provided directly to the system 100 by the platform, e.g., via the user interface 402.

In various embodiments, a player (also referred to as a user) may join a session, which contains some number of other players, all of whom can hear each other. Sessions are generally defined in code as a new voice room or channel, but the vocabulary should still be usable even if the software implementation is handled differently. When a player begins to speak, they become the speaker 102, with the other players in the session being, in that moment, their audience or listeners 104. Some platforms may incorporate proximity chat, such that the active listeners 104 in any given session may change based on the location of the players 102, 104 in the game. In this context, illustrative embodiments may provide toxicity scores based on active listeners 104 who are within the proximity chat radius.

Different technologies may collect audio from a session differently, but share the same basic primitives when it comes time to analyze. In particular, analysis is performed on individual clips. In various embodiments, a clip contains only the voice of a single player, and for no longer than the player is continuously speaking. (In other words, if the player has been harassing someone, pauses, and then begins talking about gameplay, then their speech may be separated into two distinct clips for analysis.) In principle, a session may be reconstructed by lining up all of the clips at the appropriate point on the timeline. In various embodiments, clips may overlap if two or more players are both speaking at the same time. However, the system 100 analyzes the speech content of each clip individually, and uses the surrounding context (e.g., other speech clips from other players and/or the player's toxicity history) to provide the toxicity score.

Analysis of the clips includes a number of factors. Some of the more common factors include transcription and subsequent keyword/phrase analysis; emotion analysis based on the sound of the speaker's voice; speech modes like laughter, crying, and singing; and speech behaviors like interruptions or long pauses. When assessing some harms, the system 100 also looks at these same factors in previous clips as well—for instance, to understand whether foul language was unprompted or if it was a response to another player's instigation.

Finally, when actually assessing the specifics of the situation, there is metadata to consider. This includes player profiles (who the player is—their age or gender identity, for instance, might make them more vulnerable or increase the likelihood of them being targeted), player histories (what they've done—prior offenses, reputation/trustworthiness, etc.), and social connections (whether or not two players are friends, have played together in the past, etc.)

The toxicity scorer 236 may consider a number of factors when determining a toxicity score. Accordingly, the toxicity scorer may have a number of sub-components and/or sub-modules configured to determine specific types of toxicity. The toxicity scorer 236 may provide particular toxicity values for each of the sub-categories described below (e.g., scorer, analyzer, and/or detector), or may provide a wholistic toxicity score based on a combination of some or all of the factors described below.

Additionally, other community specific considerations, which are not described here, may also be used by the toxicity scorer when determining an ultimate toxicity score. The system 100 also includes behavioral information from other mediums—such as offensive text chat, problematic usernames, or in-game cheating, farming, or other misbehavior. The system 100 also analyzes the various types of voice-chat harms, based on the particular community guidelines. The system is trained to generate a toxicity score based on the particular policy guidelines. Because the policy guidelines may vary, the system 100 may analyze a variety of factors.

In some embodiments, the toxicity scorer 236 may include a variety of different categories of analysis, including an Utterances Analyzer, a Harassment Analyzer, a Manipulations Analyzer, and a Misrepresentations Analyzer. Each of these categories generally differs from the others in two ways—both in terms of what systems are required to technically uncover them, and in terms of how platforms define what constitutes a transgression.

The toxicity scorer 236 may be trained to provide a score for each of the scorer, analyzer, and/or detector categories described below using a training data set. As the highest scoring toxic speech content is ultimately provided to the moderator 106, the feedback 132 from the moderator 106 may be used to retrain the system 100 and adjust the scoring. In general, the scorer 236 is trained using feedback from human moderator feedback 132 data on speech clips for various categories. However, some components of scorers 236 (for example, the Child Grooming Analyzer), may be updated very carefully with a full understanding of the changes. In some cases, the moderator feedback 132 may be used with little modification/interpretation to change the scorer 236. In other contexts (such as Child Grooming), moderator feedback 132 may only be used as a component of a carefully tuned update made by a data scientist.

Discussed below are a number of components/sub-scorers of the toxicity scorer 236 of various embodiments. In various embodiments, the scorer 236 may include one or more the following scorers or detectors listed below. Although the below description provides a list of various scorers and detectors, it should be understood that illustrative embodiments may use a variety of categorization hierarchies and/or categories not listed herein.

Utterances Scorer

Utterances are the most simple type of harm to detect and define. Firstly, utterances are things which are explicitly forbidden in the community's content policy/code of conduct, leaving no room for interpretation and no consideration for the history of the session leading up to the utterance. For instance, communities with a large number of children may explicitly ban Adult Language. In such a community, if someone were to utter the F word, they would immediately be in violation—it would not matter what had happened previously in the session.

On the technical side of things, an utterance occurs within a single clip. Multiple clips might chain a series of utterances together, of course, which might lead to a more severe punishment, but the actual detection of any individual utterance violation does not require awareness of more than that single clip.

Adult Language Analyzer—Adult Language is any use of terminology deemed problematic in the presence of underage participants, or otherwise simply deemed universally undesirable within "respectable" company. Adult Language includes three core subtypes that are detected by the system.

Sexual Vocabulary Detector—This includes terminology relating to one's biology, such as 'penis' or 'vagina', as well as crude terminology for sexual acts, including 'flicking' or 'cumming.' Clinical terminology such as 'coitus' is not considered an example of this type of violation.

Curse Words Detector—This includes the standard set of swear/curse words such as 'fuck', 'shit', and 'ass' As some curse words become increasingly common in everyday speech, they may be treated as less severe violations of this type—for instance, the word 'damn' might not constitute an actionable violation on its own, but 'flicking damn' may be treated as more severe an offense than 'fuck' alone.

Generic Insults Detector—This includes any terms which are fundamentally intended to be negative in all contexts, such as 'idiot' or 'buffoon.' Misappropriated clinical terms such as 'retarded' or demographic terms used insultingly such as 'gay' are not considered to fit within this category—see instead the Hate Speech categories later in this document.

Audio Assault Analyzer—In text chat, any individual player cannot truly take over the communication channel. They might type a lot, perhaps in ALL CAPS, but they cannot literally drown out the other players. Instead, the individual may only add lines and lines of garbage to sift through. In contrast, voice chat sees the voices of all speakers mixed into a single real-time channel before it is shared with any player. As a result, an individual player who is speaking sufficiently loudly or obtrusively may genuinely make it impossible to discern what any other players are attempting to say. Any actions of this type which make the audio channel unusable as a communication medium are considered Audio Assault by the system.

Technical Difficulties Detector—Audio equipment is somewhat notorious for being difficult to configure, and errors in this configuration can produce seriously unpleasant audio artifacts such as feedback or loud bursts of static. While this type of Audio Assault is rarely (though not never) intentional, it is nonetheless highly disruptive for other players and so constitutes a harm done to them.

Blaring Music Detector—A common type of Audio Assault is for the offending player to simply play extremely loud music (oftentimes choosing either rap containing offensive terms in its lyrics, or songs affiliated with memes such as 'Rickrolling', though these are hardly the only approaches.) From a detection perspective, the volume and character of the music are both important here. Game audio leaking in through the mic, for instance, is usually substantially less disruptive, and music played at reasonable volumes may simply be one player providing a soundtrack for the group's behavior or discussion, or sharing a favorite song.

Loud Sound Effects Detector—Dedicated trolls will sometimes create soundboards filled with obnoxious sounds such as sirens, farts, or alarm clocks. While these sounds can sometimes occur innocuously, a player committing Audio Assault will generally be playing many of these in sequence or simply repeating a given sound regularly, and doing so at an unusually high volume.

Repeat Phrases Detector—Perhaps the least common type of Audio Assault involves the repetition of clear phrases such as "fuck you" or "shut up." This is often accomplished through the use of a soundboard, meaning detection methods that look for the exact same signal can be quite helpful. Note that players with Tourette Syndrome may entirely unintentionally produce repeated phrases of this type as well, so fixating only on situations where the exact same signal was played repeatedly can also help ensure that any such innocent players are not inappropriately flagged or punished.

Violent Speech Analyzer—Violent Speech includes speech acts designed to make another player or group of players feel physically unsafe. Violent Speech can have substantial overlap with typical dialogue in many fighting, shooting, or combat-oriented games, so this category is particularly important to calibrate to avoid false positives.

- Threat of Assault Detector—This is the standard form of Violent Speech, involving threats of rape or claims like "I'm going to shoot you" or "I will track you down." Games with violent themes looking to avoid false positives may find it helpful to focus on types of assault impossible within the game context (e.g., rape) as well as to seek out indications of the threat extending outside the game context (for instance the use of the term 'real world' or a threat being applied to a player's mother or siblings.)
- Drug Discussion Detector—Also within the category of Violent Speech is discussion of the procurement, distribution, or use of illegal drugs. (While these conversations don't typically involve direct threats, they do lead to physical harm of players in the real world.) One helpful indicator of a violation here is the use of slang—average Players in a violent game may have occasion to mention "cocaine", but "crack rock" or "nose candy" are far less likely to be used by those purely engaging with in-game features.

Gender/Sexual Hate Speech Analyzer—This category includes any actions which show disrespect or malevolence towards another player or demographic group for reasons relating to their gender or sexual identity.

- Gender Identity Hate Detector—Detects speech meant to deride others based on their gender identity. Terms like "tranny" as well as efforts towards denial or erasure such as "there are only two genders", particularly when spoken accusingly or aggressively, are examples of this type of violation.
- Sexual Orientation Hate Detector—Detects Terms like "gay," when used as an insult, fit within this category, as do more generally the use of terms with more universally negative connotations such as "faggot."
- Gender Expression Hate Detector—Much of the time, other players don't actually know the gender identity, sexual orientation, or biological sex of their target. Instead, they jump to assumptions based on the presentation of a player's voice, word choice, behavioral style, or other characteristics, and then make hateful or offensive comments based on those assumptions. "Girls suck at video games" or "tough it out like a man" are examples of these harmful statements—while "girl" or "man" are nominally terms relating to one's biological sex, in most cases the aggressor is actually using them as shorthand for assumptions they make about one with a feminine or masculine demeanor or presentation.
- Biological Sex Hate Detector—This detects hate directed at individuals based on their biology itself, including phrases like "you play so bad, you obviously have a vagina" or "your click must be tiny if you're this bad."

Racial/Cultural Hate Speech Analyzer

This category includes any actions which show disrespect or malevolence towards another Player or demographic group for reasons relating to their cultural heritage or racial/ethnic background.

- Racial Hate Detector—Detects use of the n word, in most groups, is an example of this type of offense, as well as any other racial epithet. Do make sure to take note of the group that's having the discussion though. In the case of the n word, some black players have reclaimed the slur as a positive part of their culture, and over-aggressively banning any usage of the term actually adversely impacts these already underserved communities and makes them feel less welcome on the platform.
- Cultural Hate Detector—Detects insinuations of cultural superiority or inferiority, such as speaking in dismissive terms about the 'ghetto' or deriding the intelligence of farmers or the capabilities of so-called "citiots."
- Political Hate Detector—Detects any direct reference to political parties or affiliations, such as claiming that Trump or Biden supporters deserve to die, as well as making clearly inflammatory remarks about politicians themselves.
- Religious Hate Detector—Detects insults based on their religious affiliations or identity, including terms like "fucking atheists" or intentionally inflammatory comments about the existence of religious deities, the observance of religious traditions and rituals, or the avoidance of religious taboos.

Other Hate Speech Analyzer—The final Utterance type is a bit of a catch-all, for other derogatory comments an offending Player may make about another Player or demographic group along less common or inflammatory (but still offensive and harmful) dimensions.

- Ableism Detector—Detects any comments intended to deride individuals who are differently abled, including physical conditions such as being deaf, blind, or paralyzed as well as how an individual processes information, including comments relating to one's depression or anxiety. A consideration for individual studios is whether they would like to define appropriate vocabulary for describing such individuals—for instance, some communities prefer terms like 'handicapped', others prefer inversions such as 'handicapable', while still others find both terms stifling. Planforms may provide information to the system regarding what terminology they consider appropriate, and the system 100 is instructed to detect toxicity on that basis.
- Ageism Detector—Detects negative comments relating to older or younger Players, or more generally, derision towards any particular generation in the wider population.
- Mockery of Intelligence Detector—Detects any variation on calling someone "stupid" fits into this category, as does inappropriate use of clinical terms such as "retard" or "autistic."
- Mockery of Appearance Detector—Detects any attempt to make another Player feel bad about their physical appearance fit into this category. Do note that this category focuses specifically on visual aesthetics rather than health of the individual, which is covered in the Body Shaming category.
- Body Shaming Detector—Detects Body Shaming involves any attempt to attribute an individual's poor health (or failure to meet potentially arbitrary standards for health as defined by the offending Player) to that individual's lack of willpower, intelligence, or overall value as a person.
- Mockery of Means Detector—Detects both accusations that poorer individuals are inherently worth less, as well as the use of terms relating to wealth in a derogatory manner.
- Insults Detector—Detects any variation on direct claims that another individual has little value ("worthless", e.g.) or is themselves a bad person ("jerk", "cur", "lout", "sod", etc.)

Harassments Scorer

Harassments are the next type of violations. Unlike utterances, it is more difficult to detect whether a harassment is occurring based only on the Speaker's behavior. Instead, harassments are about whether anyone in the audience 104 has been harmed by the speaker's 102 words or actions. Harassments thus extend across multiple clips (sometimes including clips of the offending speaker 102 as well as clips of the audience's 104 reactions), potentially extending as long as a full session.

As an example, consider one player saying to another, "you should probably choose a character with higher mobility." This might be friendly advice, or it might be a belittling comment from a stranger who is making assumptions based on your age or gender identity. As such, the Harassments Analyzer provides a more nuanced technical approach, examining both the instigating actions by the speaker 102 as well as vocal and behavior reactions by the audience 104 to actually determine whether harm has been done.

Sexual Harassment Analyzer—Unlike Gender/Sexual Hate Speech, which involves very directly and explicitly deriding a victim or demographic, Sexual Harassment is targeted at a specific individual, and encompasses any unwanted attention tied to an individual's gender or sexual identity. As with all Harassments, sometimes an individual Clip will suffice—something like "Hey bitch, send nudes" is enough to immediately recognize the misbehavior. In other cases, though, Sexual Harassment can build up over the course of a Session. Further, the definition of Sexual Harassment is unwanted attention—which means it needs to be distinguish from desired attention, which may look quite similar in terms of the actions of the instigator. As such, detection of Sexual Harassment looks beyond the Speaker's actions in any given Clip and considers them within the context of how the Session has been evolving and how the targeted Player is responding to the comments.

- Propositioning Detector—This detects an instigating Player (often, but certainly not always, identifying as male) requests, solicits, or demands sexual favors or behaviors from another Player. These violations can range from subtle inquiries about a Player's relationship status, to the more overt "suck my dick."
- Dismissiveness Detector—This detects any treatment of a Player in which their competence, skill level, or general intelligence is assumed or implied to be poor based on the targeted Player's gender or sexual identity. This kind of condescension can be extremely direct, but often is couched in terms to suggest good intentions, a la "oh honey, you really should have chosen an easier character." Both attitudes can seriously harm the experience of the targeted player, though, so both should be handled in an ideal system.
- History Survey Detector—This detects the aggressor asking intrusive or offensive questions about the target Player's sexual history. The most common such inquiries relate to the Player's virginity, or their experience with a variety of sex acts, such as blowjobs or anal sex.

Demographic Exclusion Analyzer—The next Harassment type is Demographic Exclusion. As the name implies, this violation occurs in any situation in which a Player is actively excluded from participation due to elements of that Player's demographic identity. Victims of Demographic Exclusion often also experience varieties of Hate Speech or Sexual Harassment, but where those are primarily motivated by disdain or sexual interest, Demographic Exclusion stems from an attitude of possessiveness, in which the offending Players believe themselves to be "in charge" of the game community and take it upon themselves to police who is welcome to play in the first place. Who they admit may be prejudiced by feelings of hate or arousal, but may also stem from other emotions such as unwarranted paternalism.

- Sexual Orientation Exclusion Detector—Detects both explicit statements that members of the LGBTQA+ community are unwelcome to participate, or behaviors designed to make such Players feel discomfort and leave, such as by identifying a character in-game as gay and then attacking that character disproportionately.
- Biological Sex Exclusion Detector—Detects explicit statements to the effect of "no girls allowed," though there are less common examples of groups which use gratuitous language related to violence or sexuality with the express purpose of convincing the opposite sex not to participate.
- Gender Identity Exclusion Detector—Detects both explicit statements excluding nonbinary Players, as well as actions that leave no room for nonbinary Players to participate, such as requiring participants to choose a binary gender either in-game or in how they interact with the group through voice chat.
- Age Exclusion Detector—Detects exclusion based on age whether for reasons of anticipated skill or attitude ("oh god, another teenage wannabe") or due to certain Players attempting to decide on behalf of younger participants what they ought to enjoy. (It is worth noting that this type of violation does not include situations in which younger kids should actually not be permitted to join, and a Player correctly makes an effort to redirect the child from participating.)
- Racial Exclusion Detector—Detects both explicit statements excluding Players based on their race, ethnicity, or skin color, as well as efforts to restrict the options available to Players to avoid options representing certain racial backgrounds, especially in games with significant UGC elements or customizable locations and avatars.

Cultural Exclusion Detector—Detects restricting access to a group based on a Player's cultural history. This is the widest-ranging violation within the Demographic Exclusion category, and covers situations including a Player being less familiar with gaming in general or elements of the specific game, as well as Players who are told they "talk funny" or otherwise are unfamiliar with the vocabulary deemed "standard" by the offending Player(s).

Bullying Analyzer—Another type of Harassment is Bullying. Where Demographic Exclusion involves choosing what type of person is welcome and then excluding those who don't fit the bill, Bullying involves first choosing a victim to bring harm to, and then doing whatever you can think of to make them unhappy. As a result, it may sometimes be difficult to identify whether you are seeing the result of a Bullying campaign or a Demographic Exclusion campaign—or perhaps Hate Speech or Sexual Harassment—without being able to literally see inside the mind of the offending Player to understand their true motivation. Our purpose here is not to determine how to punish Players, but our recommendation given this ambiguity is to consider a less granular approach when determining appropriate punishments for many of these offenses. That said, the system may still detect each of these different cases—since, while Bullying will often overlap with other types of violations, it will not always do so.

- Targeting Demographics Detector—Detects speech that heavily overlap with the types of behaviors already detected as potential Demographic Exclusion. This sub-category is included for completeness, though, and do note that the character of such a Bullying offense may be slightly different. A Player engaged in Bullying will be searching for what hurts most—so they may jump sharply between comments on their target's race, skill, appearance, or various other characteristics, while Players engaged in Demographic Exclusion will maintain their focus on that single relevant dimension.

Targeting Skill Level Detector—Many bullies initially choose as their target a Player showing a poor level of skill relative to the rest of the group. Sometimes this is a point of frustration, especially in competitive games and e-sports, where the aggressor may be genuinely worried about their team's ability to succeed (though this understandable frustration is of course not an excuse for escalating to Bullying.) In other situations, bullies simply identify a Player who is struggling and decide to heap upon them, both making trouble for them within the game as well as deriding them vocally with either direct insults (which could be as simple as "you suck" or far more creative) or faux questions ("you, you must be inting, right? You can't possibly be this bad!"). In various embodiments, the system may be trained to detect this type of bullying.

Reduction of Value Detector—Bullies enjoy making their victims feel small, so a common tactic they employ is to declare that their target is worthless, useless, or otherwise of little value, especially in the broader world outside of the game context. These violations occasionally focus on the bully's own judgement of value ("you're nothing to me"), but frequently they aim to cause more pain to their victims by targeting the victim's relationships with statements like "does your own mother even actually love you?" In various embodiments, the system may be trained to detect this type of bullying.

Other Insults Detector—Finally, bullies may simply aim to make themselves a nuisance to their target, with obnoxious comments including "yo momma" jokes, derision of the Player's voice or speech style, implications about the Player's physical appearance, or many other options. In various embodiments, the system may be trained to detect this type of bullying.

Misrepresentations Scorer

Misrepresentations are a bit of a unique violation type, as they don't actually relate to a Player's behavior at all. A Misrepresentation is simply when a Player enters a space intended for other demographics. The most common Misrepresentation is when underage players nonetheless attempt to play games which are strictly regulated for adult usage only (e.g. with gambling or mature themes.)

Misrepresentations are not strictly a violation related to voice chat itself, but the system includes them because a Player's voice can provide crucial clues around their demographics that help to identify these violations.

Underage Analyzer—"underage" in this context, refers to prepubescent players, whose voices are physiologically different from older players and therefore can be identified sufficiently reliably to be useful, especially in combination with other signals such as different uses of vocabulary across age groups.

Prepubescence Detector—Detects when any Player is engaging with content meant for adults but is determined to be prepubescent and therefore too young to participate.

Manipulations Scorer

Manipulations are the most complex violation, and occur over the longest period of time. A Manipulation involves one Player slowly and methodically warping the perspective of another in order to bring them to a desired state. While it's possible for Manipulations to occur within a single Session, more often they build up progressively over time and many interactions. As such, detection of Manipulations absolutely requires the ability to analyze the historical interactions of the relevant Players, such that the trajectory of the relationship can be understood. This is particularly vital for early intervention. In a Manipulation such as Child Grooming, it may be possible to detect the presence of a predator by their use of highly sexualized language . . . but if the conversation has reached that point, then harm has likely already been done to the child. In order to truly protect our players from these types of harms, the system detects potential Manipulations before they reach this stage.

While how a platform/studio reacts to any violation is outside the scope of this document, however, the system considers that the earliest stages of Manipulations typically involve simply building trust, and can look very similar to a budding friendship aside from a few factors like large age differences or chat histories that only involve 1:1s with relative strangers. This means detecting Manipulations is very tricky at the early stage, as there is a high risk of false positives due to, say, a genuinely helpful coach, a child playing with their parent, or a variety of other innocuous situations. However, waiting for the situation to worsen means waiting until harm has already occurred to intervene, which various community guidelines may consider unacceptable for a complete solution. As such, the system strongly may provide softer interventions which focus on providing support and options to the potential victim, such that if the conversation turns out to be problematic, the victim can resolve or leave it directly; rather than interventions which involve penalizing the potential perpetrator when it's still possible they intend no harm.

Child Grooming Analyzer—Child Grooming involves a predator targeting a specific younger player with the ultimate goal of convincing the younger player to participate in sexual acts or create pornographic material. (Some predators may be pursuing multiple victims at once, but will generally do so separately; it's very rare for predators to attempt to cultivate multiple children through the same single conversation or group, as this counteracts the predator's efforts to isolate their victims and additionally increases their risk.)

As with all Manipulation offenses, Child Grooming does not simply happen, it generally progresses in stages. Thus, while this is really only one type of Child Grooming, the inventors consider it a valuable exercise to separate these different phases and discuss independently how a studio could detect violations within each phase. (The below phases are a slight abbreviation from frameworks the inventors have encountered elsewhere in this space. This is intentional, both to avoid sharing detailed information about predatory behaviors too broadly and because there is substantial overlap in terms of how one might detect Child Grooming between some of the more granular phases which are typically discussed.)

Phase 1-Initiation Detection

In this initial phase, a predator identifies their potential victim—often through public matchmaking—and initiates an isolated 1:1 conversation with them. (Predators often choose to change platforms at this stage, shifting the conversation to a separate platform disjoint from the game. The system may detect when the predator asks the potential victim to move the conversation to a separate platform. The system may also be trained to detect, in these initial conversations, if the predator attempts to build trust with their victim. There will be few clues as to the predator's intentions at this stage, but some conversations can nonetheless be flagged as higher risk than others. 1:1 conversations in general, for instance, are higher risk, and especially so with a major age difference between the speaking players. Discussion of topics unrelated to the game itself can also be a clue, as a predator will be seeking information about their target's family, friends, and support network. Additionally, predators often use in-game gifts to earn trust from their victim. The system can detect one or more of these symptoms/flags of Child Grooming.

Phase 2—Isolation Detection

During this phase, a predator begins to reveal themselves, shifting their approach from simply building trust to attempting to strip away their target's support systems. Conversations about the target's family and friends, especially when they are guided by the potential predator, can be an important flag that a potential Child Grooming Manipulation has reached this phase.

Phase 3—Exploitation Detection

Finally, a predator will attempt to leverage the fact that they are now the only trusted person in their victim's life to pressure the victim into a sexually compromising and sometimes life-threatening situation. At this phase, the predator may begin speaking more directly about sexual acts and become substantially more demanding of and controlling towards their target, making it easier to detect with confidence that the interaction involves real Child Grooming. Unfortunately, this stage also often proceeds quite quickly, so detecting Child Grooming at this point may be too late for even law enforcement to intervene effectively, hence our focus on the earlier stages as well. Violent Radicalization Analyzer—Violent Radicalization is a Manipulation similar to Child Grooming in many respects—you have a predator (here called a radicalist, who might be recruiting for a cult, a terrorist cause, an extralegal militia, or another dangerous cause), who identifies a potential victim and carefully cultivates them over what is usually a series of Sessions over days, weeks, months, or even years. The major differences are twofold. Firstly, the demographics of the targets are different—while sexual predators are pursuing children typically between 7 and 14 years old, radicalists are typically seeking older teenagers or young adults. The second difference is the agenda—where predators are seeking sexual gratification of some kind, radicalists want to recruit on behalf of a (typically violent, or otherwise dangerous) cause, and subsequently may push their new recruit to show their allegiance by participating in a violent or self-harming act.

Phase 1—Initiation Detector

Initiation looks quite similar here compared to Child Grooming, aside from the obvious differences in the demographics of the targets.

Phase 2—Isolation Detector

During this phase, radicalists will continue following the playbook of sexual predators, focusing on deconstructing the support system of their chosen target. In addition, though, radicalists will begin working towards their cause at this stage. They may not share their full mission statement or objective, but they will begin probing at the political resentments of their target to identify the best way to present their "true identity" to convince their target to join their cause. They may also attempt to introduce others from their cause (a resource unavailable to most child predators) to their victim, creating a new support network of (for now) friendly faces who can all work together to convert the target.

Phase 3—Exploitation Detector

Finally, in Phase 3, the radicalists will demand a demonstration of commitment for their target, who will at this point be interested in their cause. The demonstration of commitment will typically be something highly dangerous or destructive, but should the target balk, the radicalists can threaten to abandon the target, leaving them entirely without their new support network. As with Child Grooming, by the time a conversation reaches this stage, it may be too late for even law enforcement to intervene, as things can escalate quite quickly, so it's critically important for all platforms to deeply consider detection methods and potential interventions which can be deployed during earlier stages, in order to reduce the number of potential victims who are left vulnerable enough to be targeted.

Self-Harm Analyzer—The final type of Manipulation violation is Self-Harm. Self-Harm is unique in that the victim and the aggressor are the same person. However, that Player is speaking up on the online platform, either seeking guidance on the most effective, dramatic, or impactful ways to hurt themselves; announcing their intent to hurt themselves to see how their Audience immediately reacts, or sometimes inadvertently revealing their intent to hurt themselves, which can be an opportunity for studios to jump in and provide support.

In various embodiments, the system 100 recognizes that words are being spoken by specific players 102 to a specific audience 104, and so the system 100 is trained to understand the cultural norms of that conversation in order to identify whether real harm has occurred. Chats involving children, for instance, or occurring in public venues or teams composed of matchmade strangers, might default to more protective norms, while chats among long-time friends may involve a more permissive culture. While each platform sets its own rules about what is acceptable, and some may choose to explicitly forbid even friendly trash-talk using certain terms, many studios do choose to define their platform content policy (e.g., Code of Conduct and player management policies) in terms of actual harm done by the action. The system is trained to understand not just what has transpired, but the context of who said it, who heard it, and what the nature of the conversation was.

Although the above various types of toxicity are broken down into broad scorer categories, analyzer categories, and detector categories, it should be understood that the system 100 may be trained to detect and categorize toxicity in a variety of ways. Thus, various implementations do not need to categorize toxicity as it is described above, as this is simply one example of a toxicity categorization scoring system. Indeed, those skilled in the art may score toxicity using the system described herein in various ways. Particularly, the toxicity scoring may be based on community guidelines, as what is considered toxic in a first community may not be toxic in a second community. It should be understood by one skilled in the art that certain speech 110 may impact the score of one or more toxicity categories. This may be the case even if the platform content policy doesn't consider a particular type of category to be toxic. For example, the speech 110 may include racial slurs and adult language. Thus, the speech 110 may be categorized as scoring in both categories of toxicity. As an example, assume that the speech 110 includes an egregious amount of swear words. The scorer 236, may score the speech clip 110 as an adult language score of 13 and a racial-cultural hate speech score of 12. In this example, there is severe adult language (represented by raw score of 13), and severe racial-cultural hate speech (represented by raw score of 12). When generating the scores, the scorer 236 may determine that some of the racial slurs are considered adult language, and that some of the swear words make the racial slurs more harmful. These words may thus augment both category scores, i.e., the same words are contributing to both raw scores for racial-cultural hate speech and adult language. Thus, if the system 100 detects racial hate speech, but also a lot of adult language, it may determine that this racial hate speech is more severe because the speaker 102 is using adult language modifiers alongside hate speech. Thus, the racial-cultural hate speech score may be higher because of the complementary use of adult language, even if the platform content policy doesn't care about adult language individually. This is because the adult language may provide context regarding the intent behind using that slur and also make it more harmful.

Various embodiments may be used to score miscellaneous speech, that doesn't necessarily fall within the traditional concepts of toxicity. For example, such systems my include a variety of other types of detectors including:

A Background Abuse Detector—When listening to voice chat, it's possible that a Player's microphone picks up something in the background unintentionally. In rare cases, this includes audio indicating an ongoing act of violence or abuse towards the Player or another member of their household. While these are definitely problematic situations, listening for this type of situation reflects a greater incursion into player privacy, especially if detection systems become optimized to listen more closely to the background in an effort to identify these instances.

Background Medical Emergencies Detector—Similar to the previous analyzer, it is rare but not impossible for voice chat to pick up the sound of a Player choking or other immediate medical emergencies.

Sharing of Personally Identifiable Information (PII)/Other Violations of Personal Privacy Detector—On public forums, the sharing of any individual's personal information can be considered a violation of their privacy and possibly a risk to their physical wellbeing. However, in online chats between small groups of individuals, the relative risk of this kind of information being shared is quite low due to the small Audience. The most dangerous of these situations would be when a group uses voice chat to plot harm against a non-participating individual, in which case they might share PII of that individual during the discussion—so PII can be taken as an indicator of higher risk of harms like Violent Radicalization.

Fraud Detector—Some individuals may lie about their identity online in an effort to gain acceptance into a new community or deceive others into sharing sensitive information with them. The former is substantially harder to detect in gaming contexts, however, due to the existence of roleplay—many Players choose to represent themselves as their in-game character or otherwise experiment with their identity online. The latter is detectable, especially when the fraudster makes specific, testable claims about their identity. The system 100 may interface with outside platforms (e.g., news, social media, etc. to determine the validity of claims.)

Misinformation or Disinformation Detector—Detects Misinformation or Disinformation.

While these detectors do not necessarily correspond to toxicity, the same principles described herein may be used to detect these other types of speech. Furthermore, action may be taken in a similar manner. For example, a moderator may be prompted to review speech based on a high urgency score calculated because of sharing of personally identifiable information. The system may also detect that the speaker is a child, and therefore, is sharing his address, parent's credit card information or social security information, to an older audience member. This speech may receive a high score, based on the community guidelines, and may therefore be passed to a moderator who can take action (e.g., banning the child and/or recipient from further communication, etc.).

In various embodiments, the toxicity machine learning 215 may include a transcription engine 228. The transcription engine 228 is configured to transcribe speech 110 into text. The text may then be used by one or more stages 112-118 to analyze the speech 110, or it may be provided to the moderator 106.

A feedback module 232 receives feedback from each of the subsequent stages 114-118 and/or a moderator 106 regarding whether the filtered speech 124, 126, 128, and/or 130 was considered to be toxic or not. The feedback module 232 may provide that feedback to the prior stage 112-118 to update the training data for the prior stage 112-118 (e.g., directly, or by communicating with the training database 216). For example, the training data for the fourth stage 118 may include negative examples, such as an indication of the toxic speech 130 that was escalated to the human moderator 106 that was not deemed to be toxic. The training data for the pre-moderator stage 118 may also include positive examples, such as an indication of the toxic speech 130 that was escalated to the human moderator 106 that was deemed to be toxic.

The toxicity scorer 236 may provide a toxicity score along with any toxic speech 130 that is forwarded to the moderator 106 (e.g., by tagging the speech 130 or clip with a score). The system may also queue the toxic speech for the moderator 106 in order of score, from highest to lowest. As described above, the toxicity scorer may provide the toxicity score as a function of the platform's guidelines. In general, the higher the score, the higher the probability of toxicity. Of course, a reverse scoring system is envisioned as well (i.e., lower score is more toxic).

In various embodiments, feedback from the moderator 106 to the pre-moderator stage 118 may be used to adjust the scoring of the toxicity scorer. Various embodiments may use the feedback 132 to adjust the scoring of various toxic Segments or Speech Clips. The feedback may be used to adjust the overall scoring of toxic speech, and/or of individual toxicity categorizations.

Various embodiments may include an automatic action threshold setter 238. The automatic setter 238 may be configured to automatically take corrective action for toxic speech of a certain score (e.g., very egregious toxic speech that is very likely to be toxic). Thus, the setter 238 establishes a threshold score for automatically taking action in response to toxic speech of a particular score.

Each of the above components of the system 100 may be operate on a plurality of stages 112-118. Additionally, or alternatively, each of the stages 112-118 may have any or all of the components as dedicated components. For example, each stage 112-118 may have the stage converter 214, or the system 100 may have a single stage converter 214. Furthermore, the various machine learning components, such as the random uploader 218, or the transcription engine 228 may operate on one or more of the stages 112-118. For example, every stage 112-118 may use the random uploader 218, but only the final stage may use the transcription engine 228. Furthermore, in preferred embodiments the pre-moderator stage 118 has the toxicity scorer 236.

Each of the above components is operatively connected by any conventional interconnect mechanism. FIG. 2 simply shows a bus 50 communicating the components. Those skilled in the art should understand that this generalized representation can be modified to include other conventional direct or indirect connections. Accordingly, discussion of the bus 50 is not intended to limit various embodiments.

It should be noted that FIG. 2 only schematically shows each of these components. Those skilled in the art should understand that each of these components can be implemented in a variety of conventional manners, such as by using hardware, software, or a combination of hardware and software, across one or more other functional components. For example, transcription engine 228 may be implemented using a plurality of microprocessors executing firmware. As another example, speech segmenter 234 may be implemented using one or more application specific integrated circuits (i.e., "ASICs") and related software, or a combination of ASICs, discrete electronic components (e.g., transistors), and microprocessors. Accordingly, the representation of the segmenter 234, the transcription engine 228, and other components in a single box of FIG. 2 is for simplicity purposes only. In fact, in some embodiments, the speech segmenter 234 may be distributed across a plurality of different machines and/or servers—not necessarily within the same housing or chassis. Of course, the other components in machine learning 215 and the system 100 also can have implementations similar to those noted above for transcription engine 228.

Additionally, in some embodiments, components shown as separate (such as the age analyzer 222 and the user context analyzer 226) may be replaced by a single component (such as a user context analyzer 226 for the entire machine learning system 215). Furthermore, certain components and sub-components in FIG. 2 are optional. For example, some embodiments may not use the emotion analyzer 224. As another example, in some embodiments, the input 208 may not have a temporal receptive field 209.

It should be reiterated that the representation of FIG. 2 is a simplified representation. Those skilled in the art should understand that such a system likely has many other physical and functional components, such as central processing units, other packet processing modules, and short-term memory. Accordingly, this discussion is not intended to suggest that FIG. 2 represents all of the elements of various embodiments of the voice moderation system 100.

In various embodiments, toxic content (e.g., toxic speech) may be presented to a moderator in a queue based on a toxicity score. This assists with the problem of large delays from the time that a violation of community standards in a given environment occurs (e.g., on Valorant) and when corrective action is taken. Of course, it should be understood that a violation of community standards may vary based on context (e.g., a child friendly game may have more stringent standards than an adult based game). To reduce waiting times for corrective action from a moderator, various embodiments score the toxic speech content, and the toxic speech content may be provided, or displayed, to a moderator based on its scoring.

In general, in any toxic conversation, the point comes where a player says something that crosses the line and is actionable. The latency/delay of the toxicity system may be counted from the moment someone says that thing that crosses the line (i.e., violates the community guideline) until the moment that speech is available to be acted upon. In various embodiments, available to be acted upon includes that a moderator is able to see/hear the content.

As described in U.S. patent application Ser. No. 17/497,862, the moderator may receive a transcription of what was said by the offending player, what other players recently said in the conversation, and all the other context provided by the system, and then the moderator can make the decision of whether the content is a violation or it is a false positive.

In alternative embodiments, an offense may be actioned automatically. Community providers (e.g., video game studios) can configure a set of thresholds that automatically notifies the game to take action. For example, the system may classify speech under X category, provide the context around it, as well as a link to the audio. The game/platform may then automatically ban or mute an offensive player/user.

Illustrative embodiments advantageously reduce the amount of time between when a player gets harassed to the first moment that the harassment is actionable by the platform. In various embodiments, this lag time may be reduced to about 45 seconds to about 60 seconds. This lag time includes the platform uploading the audio to the system (e.g., the cloud service). To prioritize content that is most likely to violate community guidelines, and therefore reduce the overall time from when the violation was spoken to when it is acted upon, one or more stages 115 may output a toxicity confidence. The stages 115 may output their confidence in another format (e.g., as a yes or no, as a percentage, as a range, etc.). Preferably, the final pre-moderator stage 118 outputs a score that is provided to the moderator. The moderator may then review toxic speech based on its prioritized score.

Figure 3A:
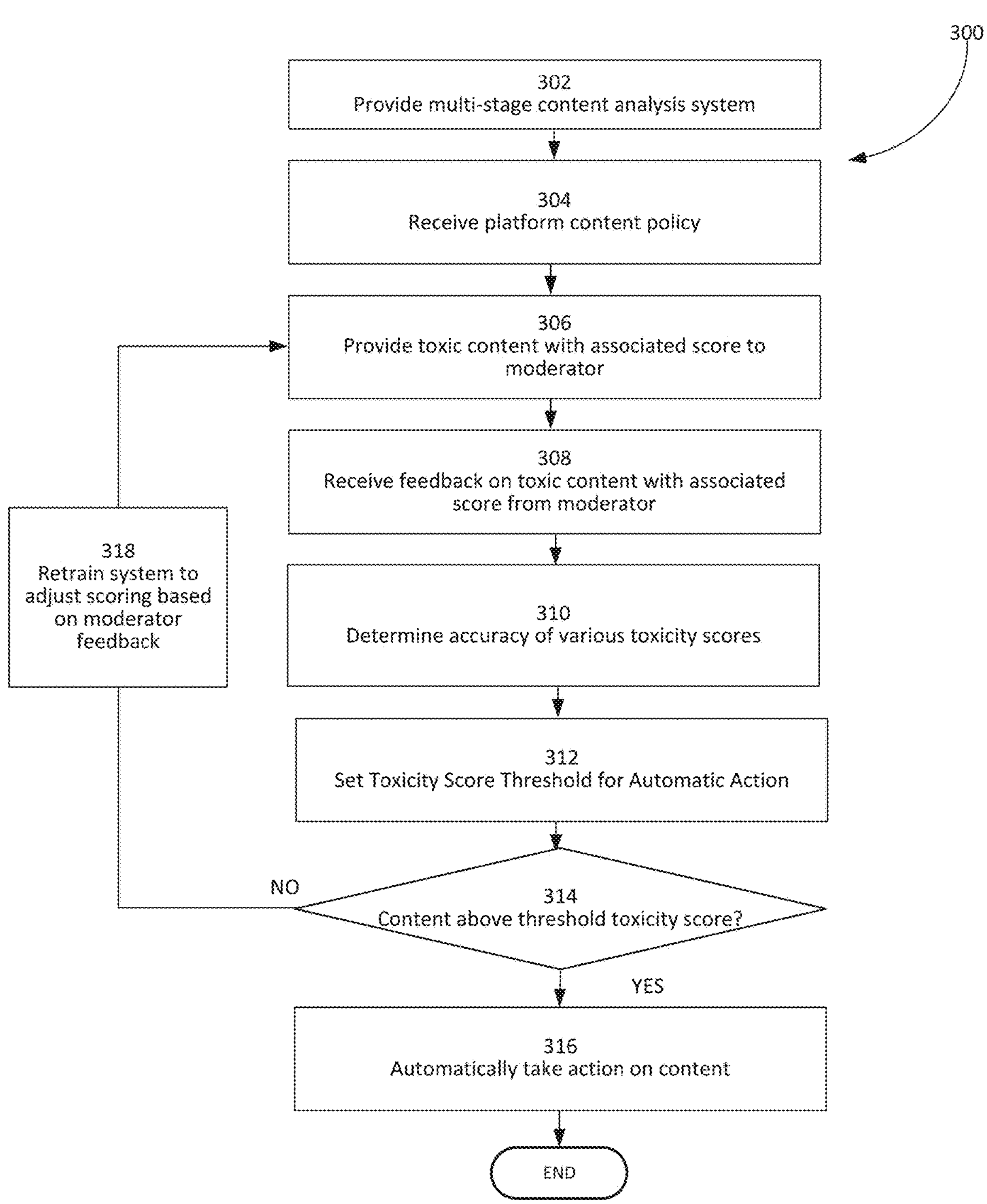
FIG. 3A schematically shows a process of using the toxicity scorer to score toxic speech content in accordance with illustrative embodiments.

FIG. 3A schematically shows a process of using the toxicity scorer to score toxic speech content in accordance with illustrative embodiments. At step 302, the process provides a multi-stage content analysis system. Parts of the system 100 are generally described in U.S. patent application Ser. No. 17/497,862, which is incorporated herein by reference. In various embodiments, the system 100 also includes the toxicity scorer 236.

The process proceeds to step 304, where the system 100 receives platform content policy guidelines. The content policy includes information about what kind of speech 110 content is considered to be toxic. The platform may provide specific details on specific categories (e.g., the types enumerated previously, such as harassments, manipulations, etc.). Furthermore, the platform may provide details about which types of categories of toxicity it considers to be more toxic than others. The system 100 may thus weight toxicity as a function of these variables. In the context of this application, the platform content policy guidelines are used to provide weights to the various categories of toxicity that are scored by the scorer 236. Frequently, the platform (e.g., Activision Blizzard) may have a written content policy, or may develop a content policy on the fly. However, the content policy may not be specific to every toxicity category (or any toxicity category) scored by the scorer 236. The platform may thus develop a content policy related to the various toxicity categories, or may develop a content policy related to the various toxicity categories by training the system based on moderator 106 feedback. The platform content policy generally refers to assigned statistical weights for each toxicity category, usually applied in accordance with the moderation goals of the platform.

Figure 3B:
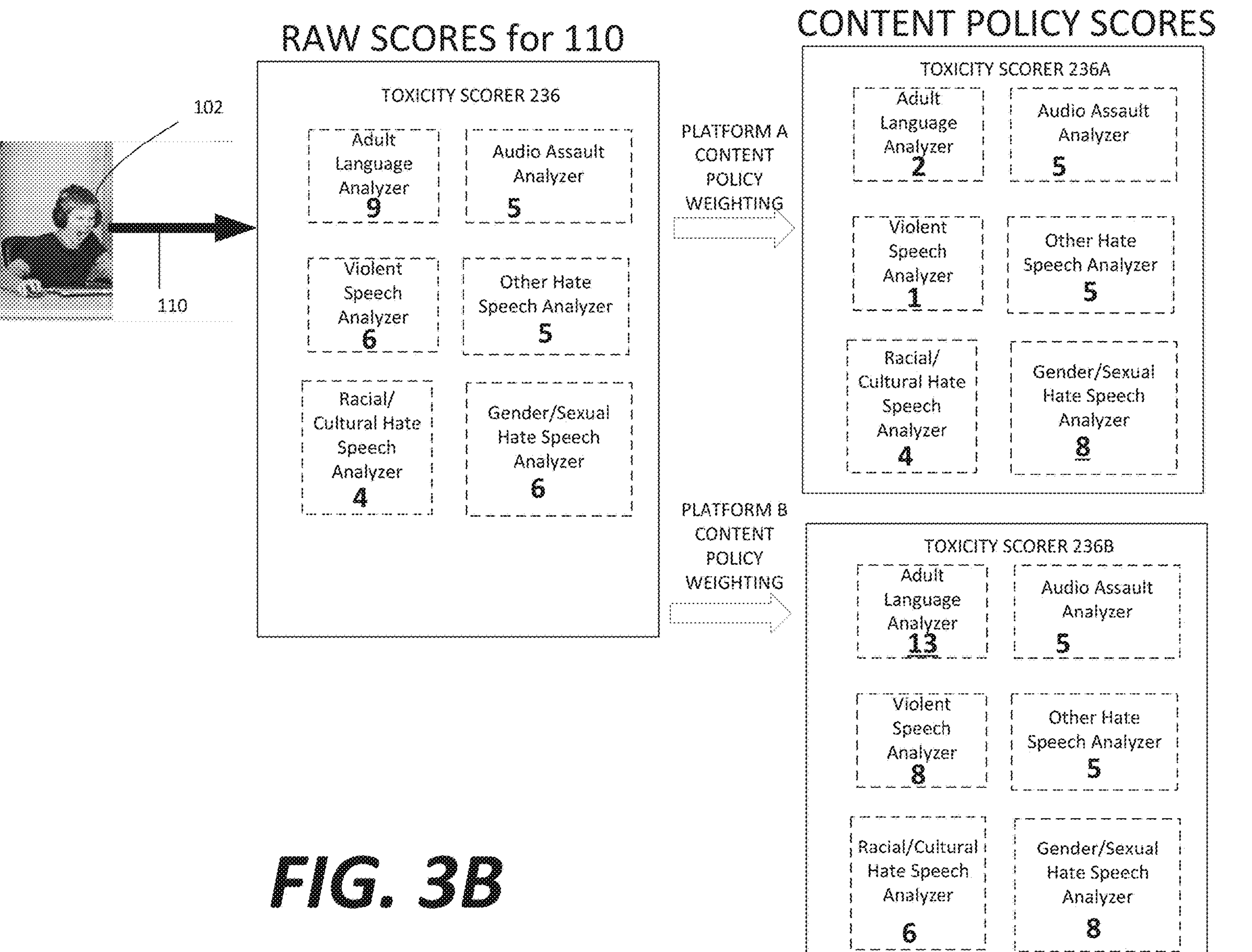
FIG. 3B schematically shows an example of weighting toxic speech as a function of a content policy for two different platforms in accordance with illustrative embodiments.

FIG. 3B schematically shows an example of weighting toxic speech as a function of a content policy for two different platforms in accordance with illustrative embodiments. A first platform has a first toxicity scorer 236A, and a second different platform has a second toxicity scorer 236B. The toxicity scorers 236A and 236B may be trained using the same raw data to determine the same raw scores within the various toxicity categories. However, the toxicity scorers 236A and 236B for each platform provide different final scores based on the received or trained weights of the platform content policy.

The system 100 receives some toxic speech 110 from the speaker 102. The toxicity scorer 236 shows a simplified version of the toxicity scorer 236 shown in FIGS. 2B-2C. As described previously, the toxicity scorer 236 is trained to determine the likelihood that the speech 110 is toxic within a number of categories (e.g., adult language, audio assault, violent speech, other hate speech, racial/cultural hate speech, gender/sexual hate speech, etc.). Thus, based on the content of the speech 110, a "raw score" may be determined for each of the categories.

Some platforms may have a content policy that dictates that all forms of toxic speech are unacceptable and equally weighted. Accordingly, the speech 110 may be marked as having a toxicity score that is the maximum of any particular category (e.g., in this example, adult language toxicity score of 9).

However, other platforms may have particular biases towards particular categories of toxicity. For example, a military shooter video game may not care about adult language or violent language. Thus, in order to help moderators 106 moderate in accordance with the content policy, toxic speech is presented to the moderator based on a weighted score after the platform content policy is taken into account instead of receiving toxic speech based on a raw toxic score.

As an example, assume that platform A is an adult title shooting warfare game rated mature (e.g., Call of Duty). Also assume for the sake of example that platform B is a game intended for young children (e.g., Roblox).

Because platform A is an adult warfare game, content policy A may indicate that the platform doesn't consider adult language to be highly toxic. Accordingly, the raw adult language score of 9 may be converted into a weighted score of 2 for platform A. The speech 110 may include copious amounts of adult language, which causes a raw score of 9. However, because the content policy of platform A is largely permissive of adult language, the weighted toxicity score for adult language may drop (e.g., to a 2). On the other hand, the content policy of platform B may be highly sensitive to adult language, particularly because the platform is targeted towards children. Thus, the content policy may be sensitive to adult language. Accordingly, the same speech 110 having the raw score of 9 may be, for example, upgraded to indicate a toxicity score of 13 based on the content policy.

Similarly, the content policy of platform A may provide that violent speech category isn't a violation of the content policy. For example, because the game involves players killing one another, this type of language may be largely associated with gameplay. Thus, the speech 110 having a high raw score in the violent speech category is not considered a content policy violation that should be escalated to the moderator 106. Thus, while the raw score for violent speech may be high, the content policy lets users 102 talk about killing each other (e.g., because that is the point of the game). The weighted score for violent speech thus goes lower for that given content policy. Advantageously, this prevents moderators 106 from having to spend time reviewing toxic speech that is not considered a violation of the rules of the platform.

Returning to platform A, it may also be the case that the example speech 110 includes gender/sexual hate speech. While platform A may be tolerant of adult language given the warfare context, it may not tolerate gender/sexual hate speech. Accordingly, the raw score of a 6 may be adjusted to a weighted toxicity score of 9. This type of adjustment based on the content policy may be made on a category-by-category basis, in accordance with the content policy. The speech 110 may ultimately receive a single toxicity score in accordance with the content policy. The single toxicity score for the speech 110 may be a combination of scores, or a maximum score. In the example of FIG. 3B, the toxicity score for the speech 110 using the content policy of platform A may be the maximum toxicity score (e.g., toxicity score of 8). The moderator 106 may thus be provided with a clip of the speech 10 identified with a toxicity score of 8 in the gender/sexual hate speech category.

In a similar manner, the toxicity score for the speech 110 using the content policy of platform B may be the maximum toxicity score (e.g., toxicity score of 13). The moderator 106 for platform B may thus be provided with a clip of the speech 10 identified with a toxicity score of 13 in the adult language category There are a number of ways to receive the platform content policy and to implement the policy guidelines into the system 100 such that an accurate identification of particular types of toxicity may be achieved. As an example, for any of the categories shown in broken lines in FIGS. 2B-2C (e.g., adult language, audio assault, etc.), the platform's content policy may be used to associate a priority score of how much the platform cares about toxicity of a particular category.

One method for implementing the content policy in accordance with illustrative embodiments is to provide a default moderation system 101 with pre-assigned toxicity weights for each of the categories (e.g., each category is equally weighted). Then, the moderators 104 provides feedback 132 indicating when toxic speech content should have been escalated but wasn't (e.g., from discarded speech 111 escalated using the random uploader 218), and toxic speech content was escalated but shouldn't have. The system 100 may be retrained using that feedback 132 to begin to align with the desired content policy settings. This allows the system 100 to look at the moderator feedback 132 on a per category basis and help determine the types of speech that are considered to be toxic and non-toxic in accordance with the content policy.

As another example of implementing the content policy, various embodiments may provide the moderator 106 with a slider or other manipulatable tool for each of the categories (e.g., other hate speech, adult language, etc.) within the user interface 402. The various categories of toxic speech may thus be weighted based on the slider values.

As yet another example of implementing the content policy, a survey may be provided to the platform with examples of toxic speech content. The platform may respond regarding whether the various examples are or are not a violation of the content policy. The system 100 may be trained to determine content policy settings based on the survey responses.

Generally, illustrative embodiments may implement the content policy on a category-by-category basis. For example, the content policy may be related generally to the category of gender/sexual hate speech, rather than the individual detectors within the category (e.g., gender identity hate and/or biological sex hate). Using higher level categories provides a number of advantages, for example: that level of granularity makes it too easy to overfit, customers are unlikely to express their content policy/code of conduct well within that, and it provides too much danger of starting to use the system 100 as a tool for discrimination. However, some embodiments may provide for varying levels of categorization and/or customization of the categories. For example, any of the solid boxes within a dashed-line category may become their own dashed-line category, and vice-versa.

In general, the platform provides information relating to their code of conduct. The system 100 assigns an initial weighting based on the content policy/code of conduct and how well it fits within the toxicity categories. In some embodiments, a human may review the content policy and perform a mapping of toxicity weighting relevant to the toxicity categories. In some other embodiments, the system 100 may automatically assign weights (e.g., based on survey answers, default settings). Initial category weights may be assigned, and then may be adjusted based on moderator 106 feedback. Alternatively, all categories may be weighted equally, and moderator 106 feedback may be used to adjust the weights.

Although FIGS. 2B-2C schematically show a variety of toxicity categories, it should be understood that a toxicity moderation system as described herein may use a variety of categories, including categories not described herein. Furthermore, some embodiments may not combine sub-categories as described herein (e.g., religious hate and political hate may be their own category, rather than scored under a single category). Those skilled in the art can conceive a number of ways of achieving toxicity categories as described herein.

As another example, any of the solid line boxes of FIGS. 2B-2C could be dashed line boxes. For example, all the manipulations sub-categories (e.g., child grooming detector, violent radicalization detector, and/or self-harm detector) may be provided in their own toxicity category with an independent raw and weighted score.

In general, the sub-categories (represented by solid line boxes) are combined into categories (represented by dotted line box categories) advantageously for (a) ease of use (better to have fewer things to configure in accordance with the platform policy), (b) easier implementation across different platform content policies (e.g., a particular platform may not have an opinion on specifies sub-categories, such as dismissiveness proposition and history survey for sexual harassment, but may have an opinion on sexual harassment), and (c) prevents misuse of the system 100. For example, by limiting implementation of the content policy to particular categories, it may be more difficult to use the system 100 as a surveillance technology instead of moderation software. However, some embodiments may allow for complete customization of the categories and sub-categories.

In various embodiments, the categories (i.e., dashed line boxes) get a raw score. The sub-category analyzers (i.e., solid line boxes) identify instances of these things occurring along with severity (which may also provide a sub-score). The scorer 236 combines the findings of these different sub-category analyzers to produce that top level category score for the category analyzer.

The process then proceeds to step 306, where the system provides toxic speech content with an associated toxicity score to the moderator 106. As discussed above, the toxic speech content is scored based on the platform content policy provided in step 304. The toxicity scorer 236 may be trained using speech 110 data sets that are initially scored manually by a human moderator 106 (e.g., in accordance with the platform content policy). The system (i.e., the pre-moderator stage 115) provides a score along with the toxic speech content to the moderator at step 306.

As described previously, the system may be trained to develop a score using a variety of factors (e.g., detections of utterances, harassment, etc.). The weighted score is ultimately based on the content policy (e.g., Call of Duty doesn't worry about adult language, but Roblox does). The weighted score is thus tuned to the customer specific setting/community guidelines. As direct feedback is received from moderators (i.e., yes or no violation of content policy), that is used as a training signal. The system adjusts its scoring mechanism with that data so the parameters that can be tuned to escalate more things at high scores, given those customer specific content settings. That data is ultimately obtained in batches and used to train and update the system.

As described previously, the toxicity scorer also looks at factors such as how did other players respond to the toxic speech and how confident is the system in their response. Other factors may include: user history of this behavior, demographics of the participants in this conversation, speaker/audience sex characteristics, speaker/audience age characteristics, etc.

The toxic speech content that is forwarded to the moderator is usually scored in the form of clips, which may be—

(a) An isolated segment of speech, having a pause before and after for a duration of time (e.g., 2 seconds).

(b) batched into predefined clip length (e.g., 15-second clips).

The toxicity score provided for each clip may vary from clip to clip. Even if a speaker says the same thing twice in a single session (e.g., once early and once later), the two clips may be scored differently. For example, the later clip might be scored higher because the speaker has a previous history of that the particular toxic speech content. The second clip is thus assigned a higher score. On the other hand, if someone says something that is toxic but is received as funny by the audience, that may drop the harassment sub-score, but the bad-language score may still go up. The toxicity may be categorized within a number of different categories previously outlined above, some of which include: Adult-language, hate-speech gender, hate-speech racial, violent speech, gruesome content, harassment sexual, racial, bullying, misrepresentations (pretending to be part of a community when you are not—children being to be adults), age limit, self-harm, radicalization of other people, putting children in danger, etc. In various embodiments, step 306 may provide the toxic content with the associated score to the moderator 106 via the user interface 402 described below with reference to FIGS. 4-14.

At step 308, the system receives feedback on the toxic speech content from the moderator. For example, the moderator may indicate that the content was a true positive or a false positive. For example, the moderator 106 may provide explicit true positive feedback in the form of a score, or a moderator action (e.g., ban, mute, etc.). Additionally, or alternatively, the moderator 106 may indicate that the contact was a false positive by explicitly labeling it as such, or by resolving the toxicity item without taking any moderator action. Illustrative embodiments may use a variety of different feedbacks from the moderator 106 to adjust the training of the system 100.

Although the system 100 may be trained to score toxicity on a platform-by-platform basis (i.e., as a function of a particular content policy of the platform), the system 100 may use feedback from multiple platforms to improve the overall detection for the raw scores. For example, feedback from the moderator 106 of a particular platform may be used to refine the machine learning understanding of what is considered toxic for the platform. For example, a particular platform (e.g., Call of Duty) may indicate that racial-cultural hate speech is toxic. While the moderator feedback may also help refine the scoring for the platform, it may also help provide feedback to train the system regarding proper identification of racial-cultural hate speech.

The system 100 thus makes a distinction between understanding and scoring. There is a set of understanding machine learning 215 that includes, among other things, transcription, emotional analysis, speaker volume, and music detection, that provide an understanding of what is happening in the analyzed speech 110. This understanding may include that the speaker 102 is harassing one or more listeners 104 in the session/conversation, or that the listener 104 is being harmed by something being said by the speaker 102. The system 100 generates a raw score that indicates the understanding of the analyzed speech 110 in various toxicity categories. The raw scores are thus generally consistent across platforms. Then, after the system 100 understands the toxic speech 110, it determines whether the platform content policy cares about the toxicity or not (or how much it cares). That happens on a per-platform basis. Thus, for example, the raw score indicates that the speaker 102 is saying a given amount of adult language, which is true whether or not that is allowed by the content policy. Then, the system 100 generates a weighted toxicity score that reflects how much the platform cares about the adult language. For any particular speech clip, the scorer 236 may have a raw score in every category (e.g., blaring music, drug discussion, etc.), as well as a weighted score based on the content policy of the platform.

The process then proceeds to step 310, which determines an accuracy of various toxicity scores. As an example, a moderator may receive potentially toxic speech with a score of 5, and potentially toxic speech with a score of 13. The moderator may determine that the content having a score of 5 is not toxic, and that the content having a score of 13 is toxic. This process may be repeated multiple times with toxic speech content of various scores to gather a data set indicative of the true positives associated with a particular score. For example, in testing, human moderators may determine that toxic speech with a score of 13 is a correct determination of toxicity within community guidelines 99% of the time (i.e., a true positive) and that toxic speech with a score of 5 is a correct determination of toxicity 25% of the time.

The process then proceeds to step 312, which sets a toxicity score threshold for automatic action. The platform may instruct the automatic action threshold setter 238 that toxic speech with a score of 13 should automatically be acted upon because it meets a desired threshold (e.g., 99% accuracy). This may be done via the user interface, for example.

At step 314, the process asks whether content is above the threshold toxicity score? If the content is above the threshold toxicity score, then the process proceeds to step 316, and automatic action is taken. For example, a user 102 with an associated speech segment 110 above the threshold toxicity score may be automatically chat banned for a period of time.

If the content is not above the toxicity score threshold, then the process returns to step 306. The process at some point may also proceed to step 318, which retrains the system to adjust scoring based on the live moderator feedback. In various embodiments, the feedback does not go back to each stage. Instead, the feedback goes directly to the toxicity scorer, which uses the feedback to adjust the toxicity scoring. To train the scorer 236 and the setter 238, a human moderator looks at toxic speech having an associated toxicity score at step 306. To train the automatic action setter 238, the human moderators initially determine whether the scored speech is a true positive (i.e., a correct determination of toxicity within community guidelines).

The system may then be further trained after an automatic action threshold score is selected at step 312 (e.g., a threshold score of 13). After the automated action threshold score is set, the human moderators start handling toxic speech content of a lower score (e.g., score of 10-11, or 11-12), where the system 100 is not extremely confident of the toxicity. Thus, the moderators are focused on more difficult to determine cases, and that feedback may be used to improve scoring further. After receiving considerable feedback (e.g., a month later after training, a threshold score of 12 or over may become 99% accurate), then the automation threshold setter 238 may drop the threshold score for automated action (e.g., to any content with a score of over 12, instead of 13). The process is then repeated, and moderators start reviewing content with scores of 10 or 11 until the system becomes more confident and the threshold setter 238 may again drop the threshold (if the associated toxicity score is sufficiently accurate in accordance with the platform's expectations).

It should also be noted that various embodiments may also account for appeal statistics when training (e.g., at step 318). For example, a user may appeal an automated action, and the system may take into account how often the automated decisions are overturned on appeal to adjust the scoring.

FIGS. 4-13 show various screenshots of a user interface 402 for a toxicity moderation timeline 400. Various embodiments score toxic speech, transcribe the associated speech into text, and display the timeline 400 of a conversation to the moderator 106. To best assist the moderator 106 in taking a corrective action as a result of toxic speech, associated context (e.g., other speech that is nearby to the toxic speech) is provided to the moderator 106 in a convenient user interface 402.

Figure 4:
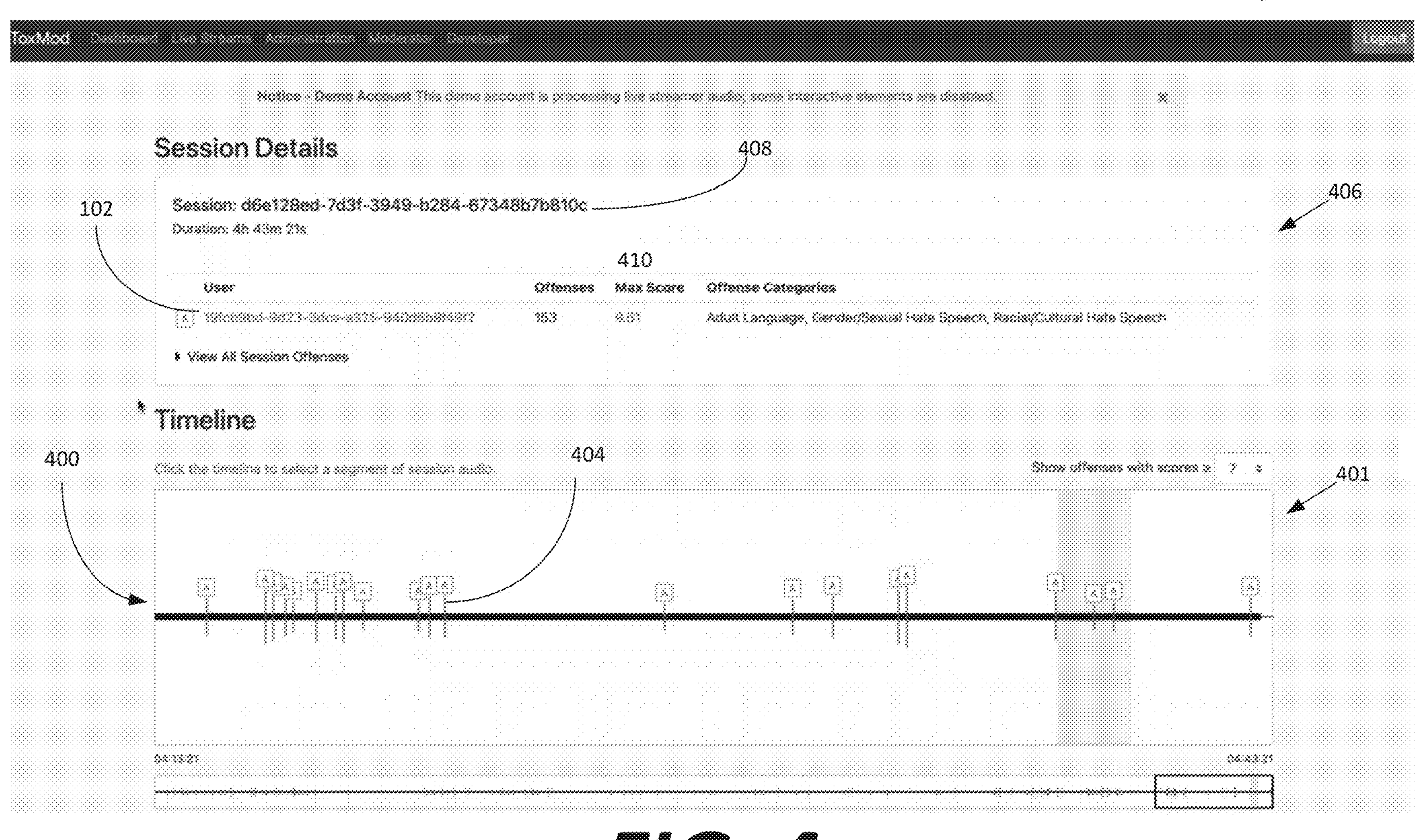
FIG. 4 shows a detailed toxicity moderation timeline (also referred to generally as the toxicity moderation timeline) in a user interface in accordance with illustrative embodiments of the invention.

FIG. 4 shows the user interface 402 having the toxicity moderation timeline 400 in accordance with illustrative embodiments of the invention. To that end, the user interface 402 includes a timeline display window or timeline display area (generally referred to as the timeline display 401). In the example of FIG. 4, a single speaker 102 (e.g., a Twitch streamer) is represented by the orange letter A. Each instance of detected toxicity is displayed as a toxicity indication 404 (e.g., as a vertical bar). In various embodiments the timeline 400 includes an associated user identifier 455 (e.g., letter "A") that is integrated into the toxicity indicator 404 or timeline 400. Thus, in various embodiments, the toxicity indication 404 may also identify the speaker 102. In the case of additional speakers 102 in a given communication session, the additional speakers also are represented by a unique user identifier 455 (e.g., by a different color and/or letter, such as B, C, D, etc.).

The session display window or session display area (generally referred to as the session display 406) shows the session label 408 for the particular voice chat session. The session label 408 may be an internal label assigned by the platform hosting the chat service. The number of toxic violations for the particular user 102 are displayed, as is the maximum toxicity score 410 based on the platform community guidelines in any given session. Furthermore, the offense categories for the various offenses may be listed in the session view 406.

Figure 5:
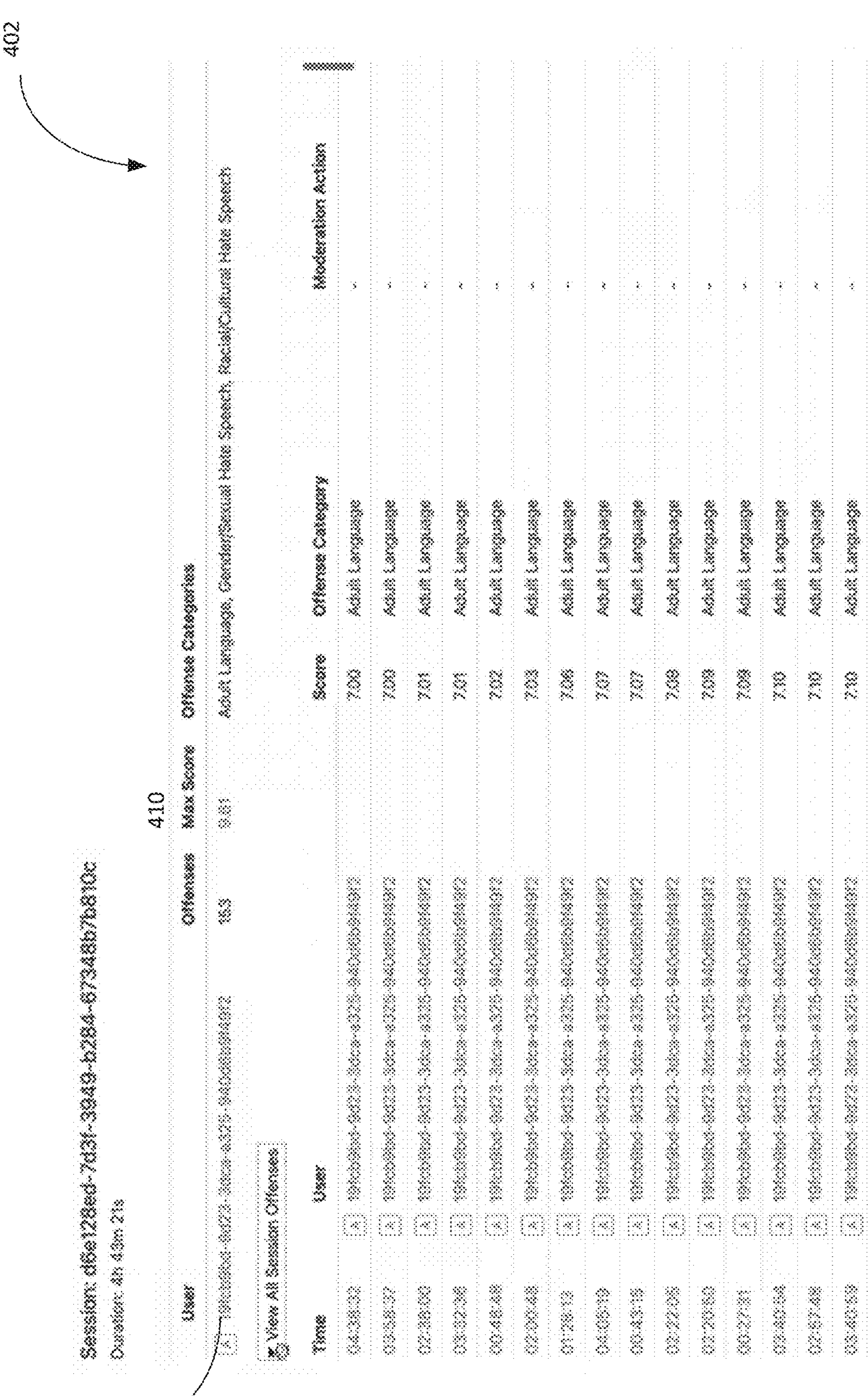
FIG. 5 shows a list of toxicity offenses in the user interface in accordance with illustrative embodiments of the invention.

In the timeline display 401, the moderator 106 may filter toxic segments based on their score. In the screenshot of FIG. 4, only offenses with a score of greater than 7 are shown. Furthermore, along the timeline 400, the length of the toxicity identification marker 404 may be associated with the toxicity score. For example, the longer the identifier 404, the higher the toxicity score. As another example, the color of the toxicity indicator 404 may be associated with toxicity score. FIG. 5 shows a list of toxicity offenses in the user interface 402 in accordance with illustrative embodiments of the invention. The moderator 106 may select "view all session offenses" from FIG. 4 to see a list of all session offenses with timestamps. Additionally, the total number of offenses committed by the user 102 (relative to community guidelines) is easily viewable. Some embodiments may also show the maximum toxicity score 410 of the user 102, as well as categorize the type of toxicity.

Figure 6:
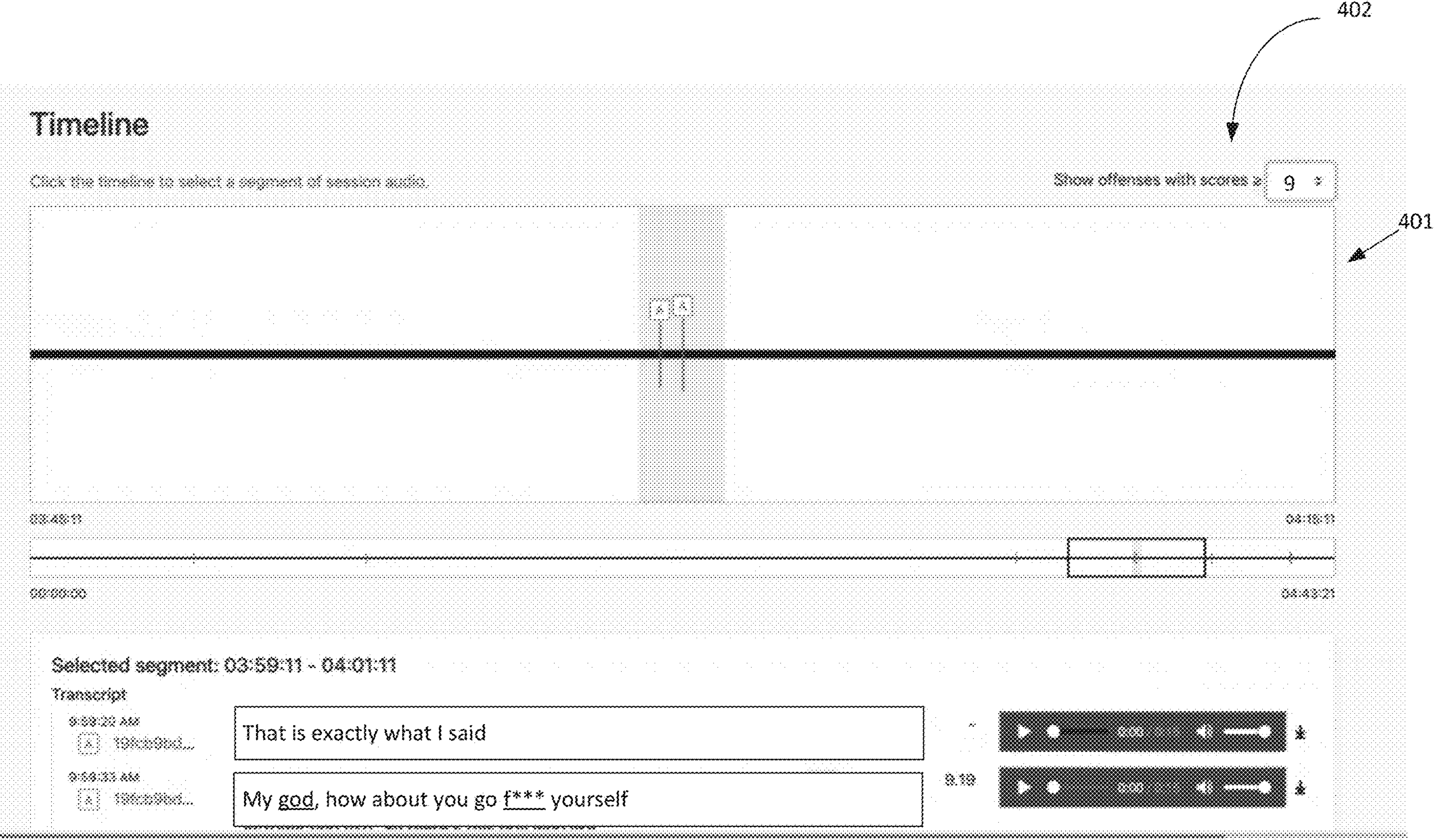
FIG. 6 shows the toxicity moderation timeline of FIG. 4 filtered to show instances of toxicity having a higher score.

FIG. 6 shows the toxicity moderation timeline 400 of FIG. 4 filtered to show instances of toxicity having a higher score (i.e., above a score of 9). Thus, illustrative embodiments enable moderators 106 to quickly search for different ranges of toxicity scores. For example, the moderator 106 may want to begin by viewing the most toxic speech rated by the system 100. Alternatively, in some embodiments, toxic speech above a given toxicity score is automatically handled by the system 100. Instead, the moderator 106 may wish to view a mid-tier of toxicity to make a human determination regarding toxicity on speech that the system 100 has less certainty on, and thereby helping to improve the toxicity detection system 100.

Figure 7A:
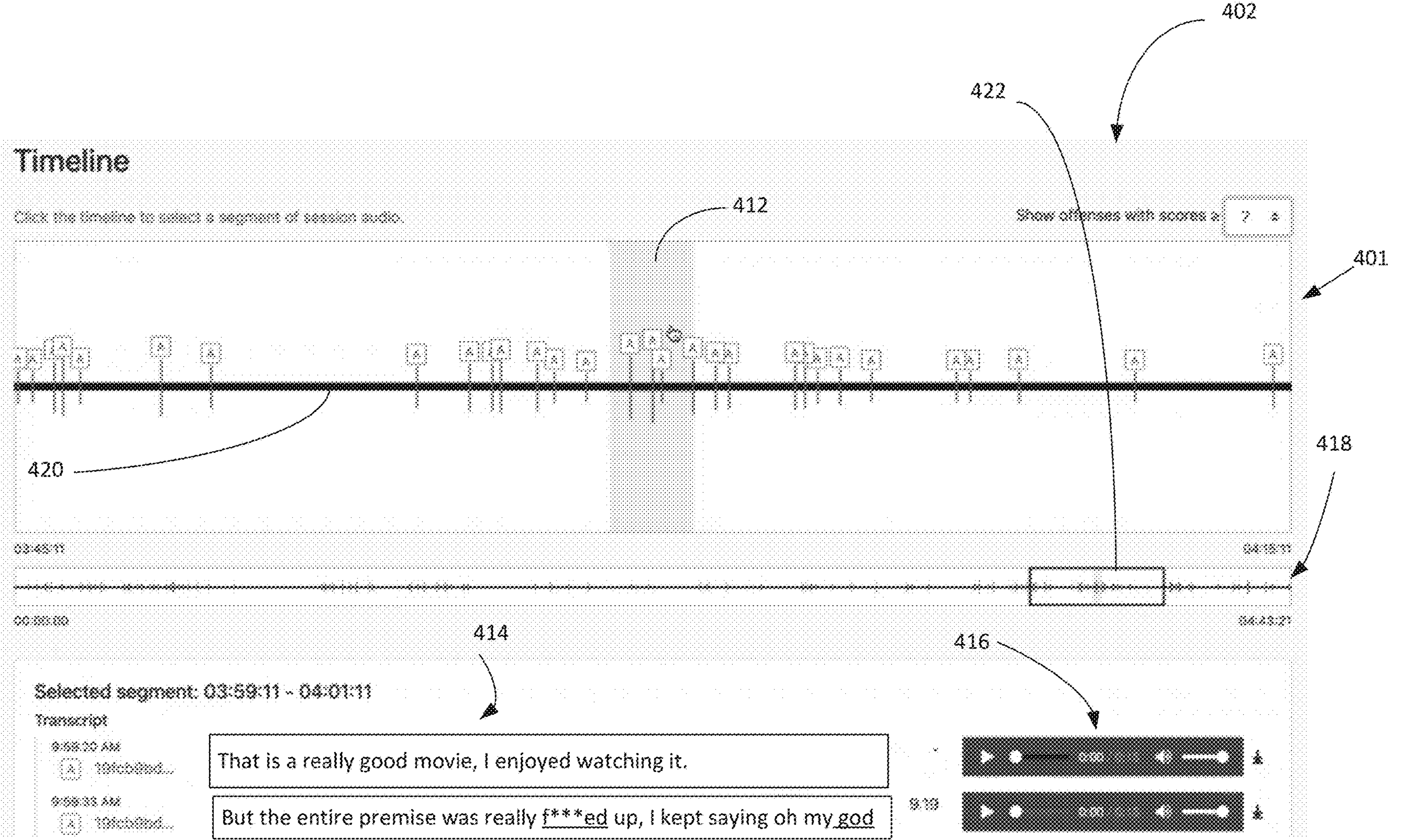
FIGS. 7A-7B show user selections of different portions of the detailed toxicity moderation timeline in accordance with illustrative embodiments of the invention.
Figure 7B:
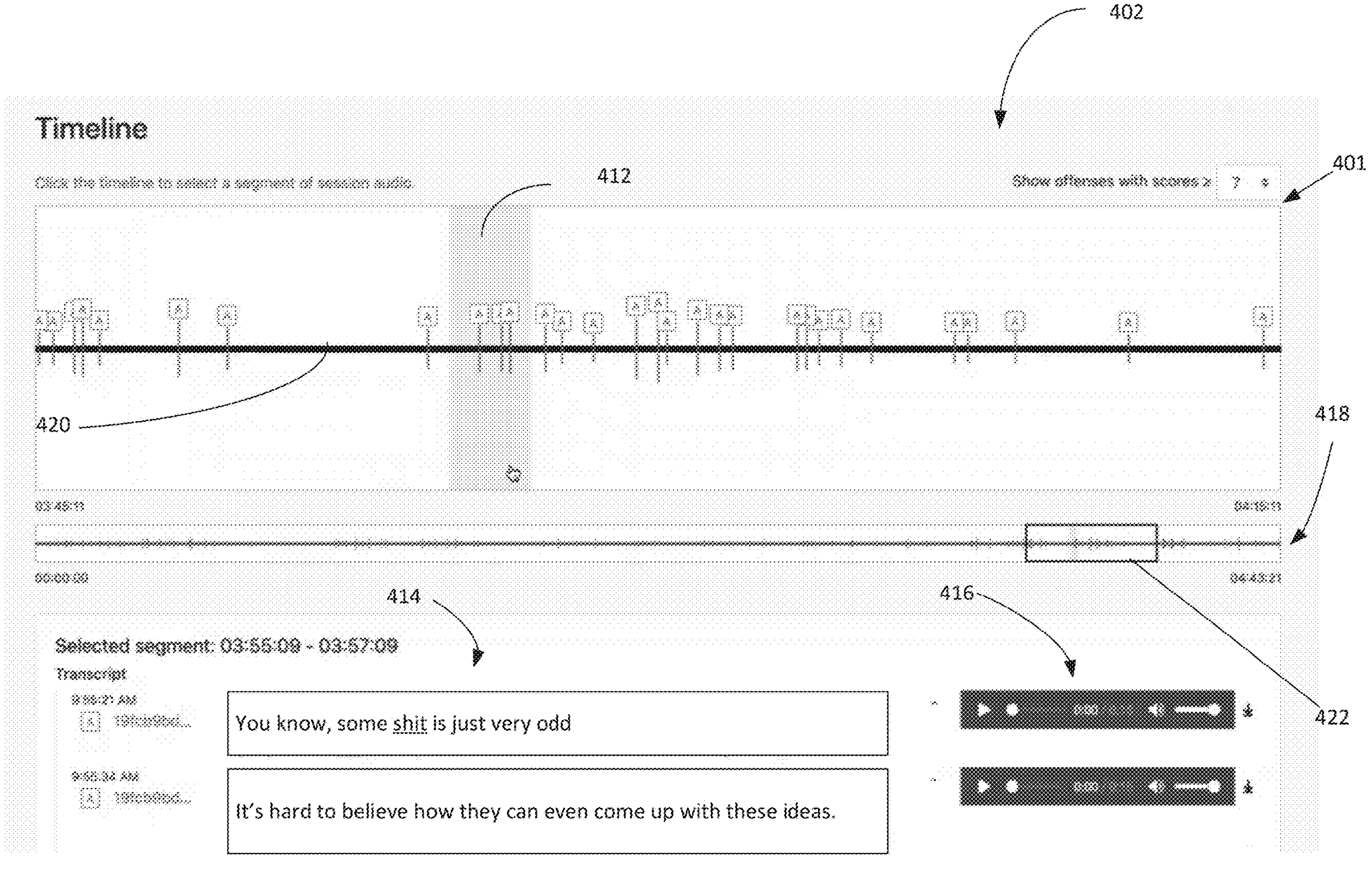

FIG. 7A shows a user selection 412 of a portion of the timeline 400. As shown, by providing an input (e.g., clicking) within the timeline 400, the toxic speech nearest to the input is selected. The user interface 402 displays, among other things, a transcription 414 of the toxic speech, as well as a link to the audio 416, for the selected toxic speech. Some embodiments include a selectable session timeline 418. Additionally, the selected portion 422, which is displayed in the detailed timeline 400, is visually indicated in the session timeline 418. FIG. 7B shows a user selection of a different component of the timeline 400.

Additionally, the time axis bar 420 may have varying thickness that corresponds to the amount of speech from the speaker 102 or from everyone involved in the conversation. In the screenshot shown, the horizontal time axis 420 is relatively thick, indicating that there is consistent talking. Gaps or reductions in the conversation may be represented by thinner portions in the horizontal time axis bar 420. However, despite the consistent talking, there are periods without toxicity. This helps to provide an overall story of the toxicity regarding whether the speaker 102 is entirely toxic, or whether there are instances of non-toxicity.

Figure 8A:
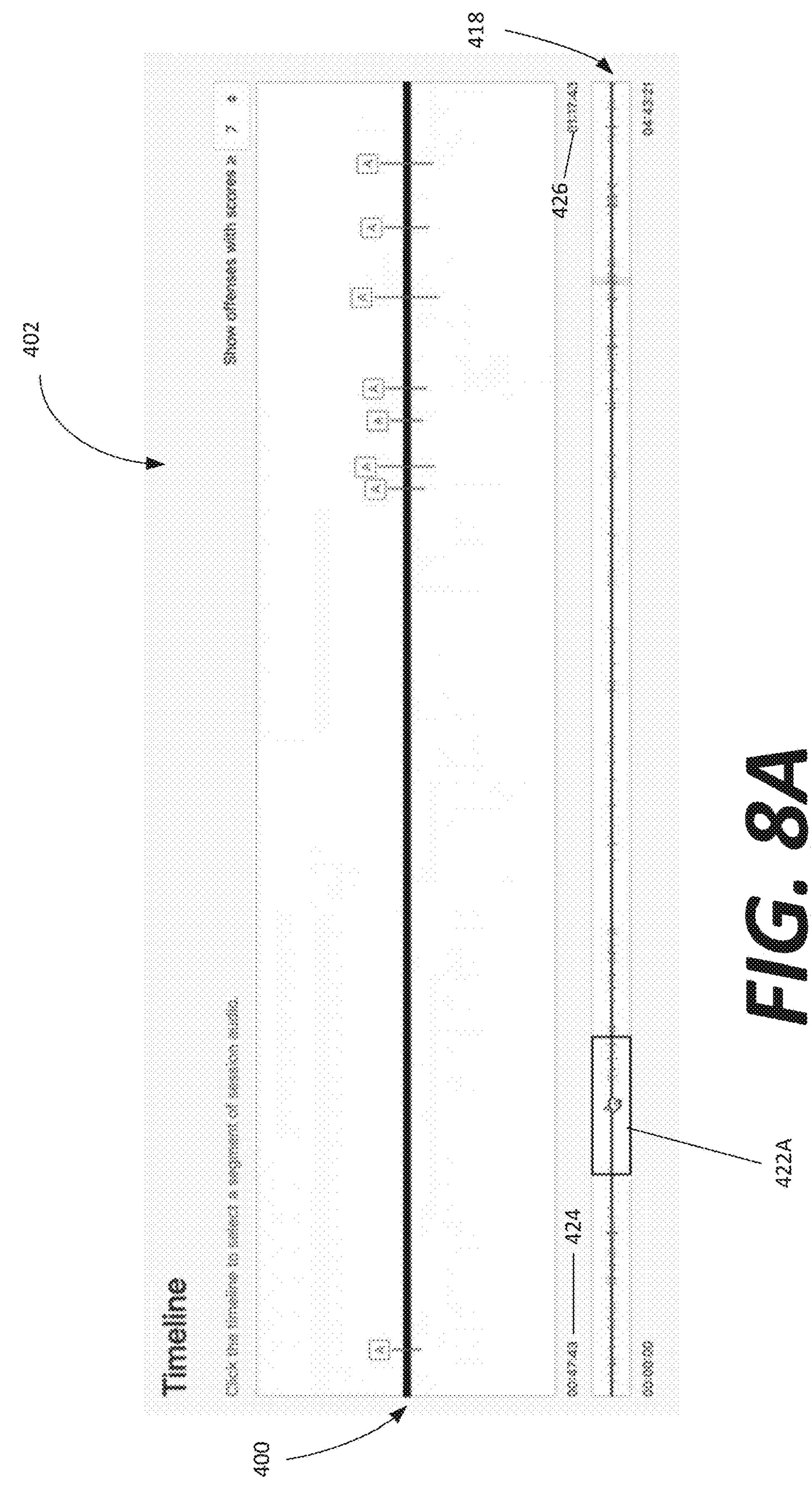
FIGS. 8A-8B show user selections of different portions of the entire session timeline in accordance with illustrative embodiments of the invention.
Figure 8B:
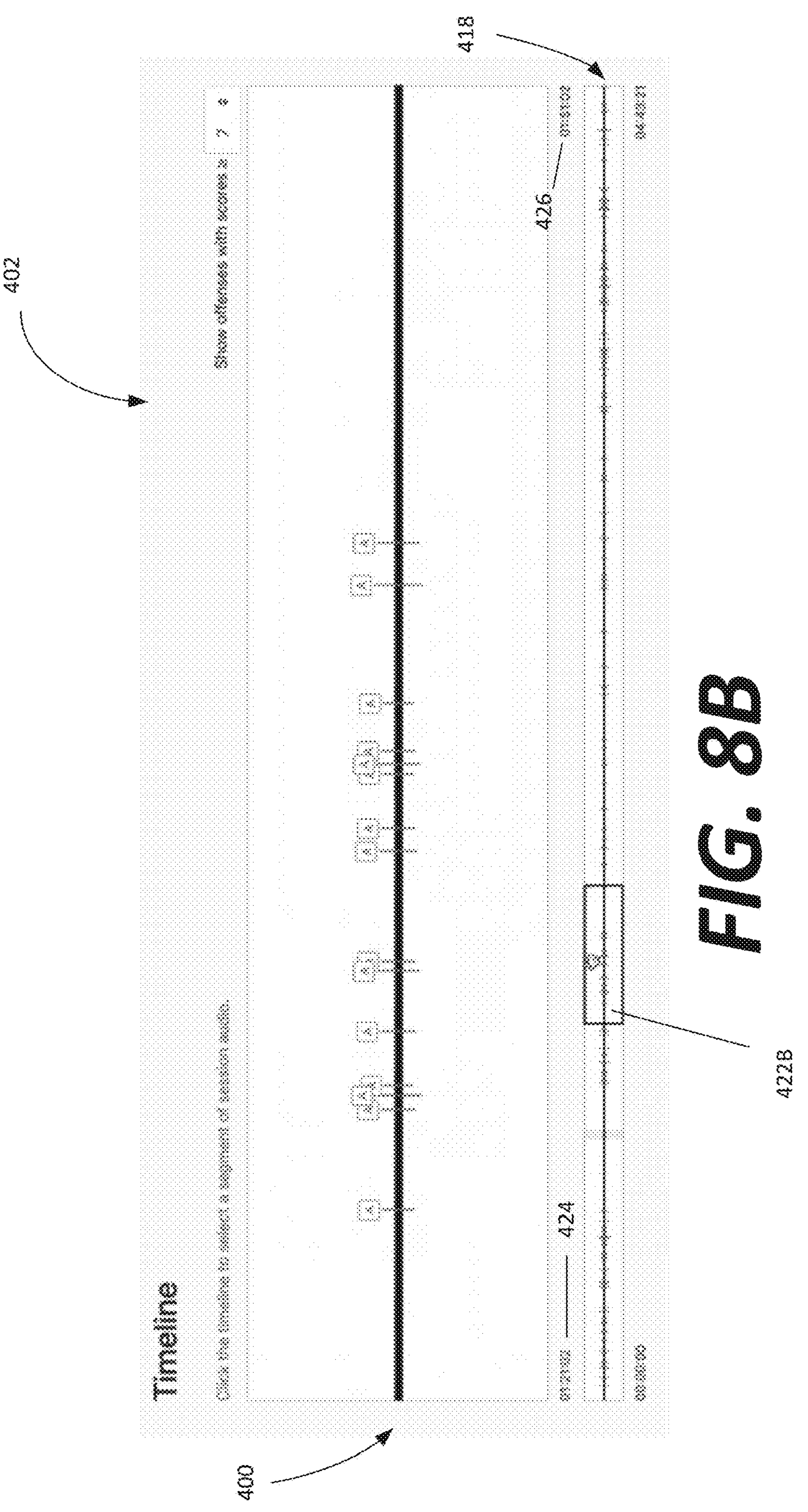

In addition to the detailed timeline display 401, the user interface 402 may show the entirety of user's 102 session. The moderator 106 may select segments and move quickly to see various portions of the speech in a more detailed view. In this example, the streamer is streaming for 4 hours, 43 minutes, and 21 seconds. The timeline 400 shown is a 30-minute window, while the session timeline 418 may show a greater portion, or all, of the session. The moderator 106 may quickly navigate to various parts of the session by adjusting the input with the session timeline 418. Thus, the moderator advantageously may quickly jump between various parts of the conversation by selecting different portions 422 of the session timeline 418 to view in the detailed timeline 400. The session timeline 418 also allows the moderator to see the flow of the conversation, and to jump to specific segments that are toxic for a deeper dive. For example, FIGS. 8A-8B schematically shows a different selected timeline view. FIG. 8A shows a first selected portion 422A in accordance with illustrative embodiments.

FIG. 8B shows a different selected portion 422B of the session timeline 418. For moderators 106 trying to get through as many sessions as possible, the user interface 402 allows the moderator 106 to get an easy understanding of the flow of the conversation and then dive deeper where necessary. The detailed timeline 400 corresponds to a given selected portion 422, which is visually indicated in the session timeline 418. Thus, as can be seen from the movement of the selected portion 422 between FIGS. 8A and 8B, the detailed timeline 400 changes. For example, FIG. 8A has a start time 424 from 00:47:43 to an end time 426 of 01:17:43 (e.g., a 30-minute window). FIG. 8B shows the detailed timeline 400 having a start time 424 from 01:21:02 to an end time 426 of 01:50:02

Figure 9:
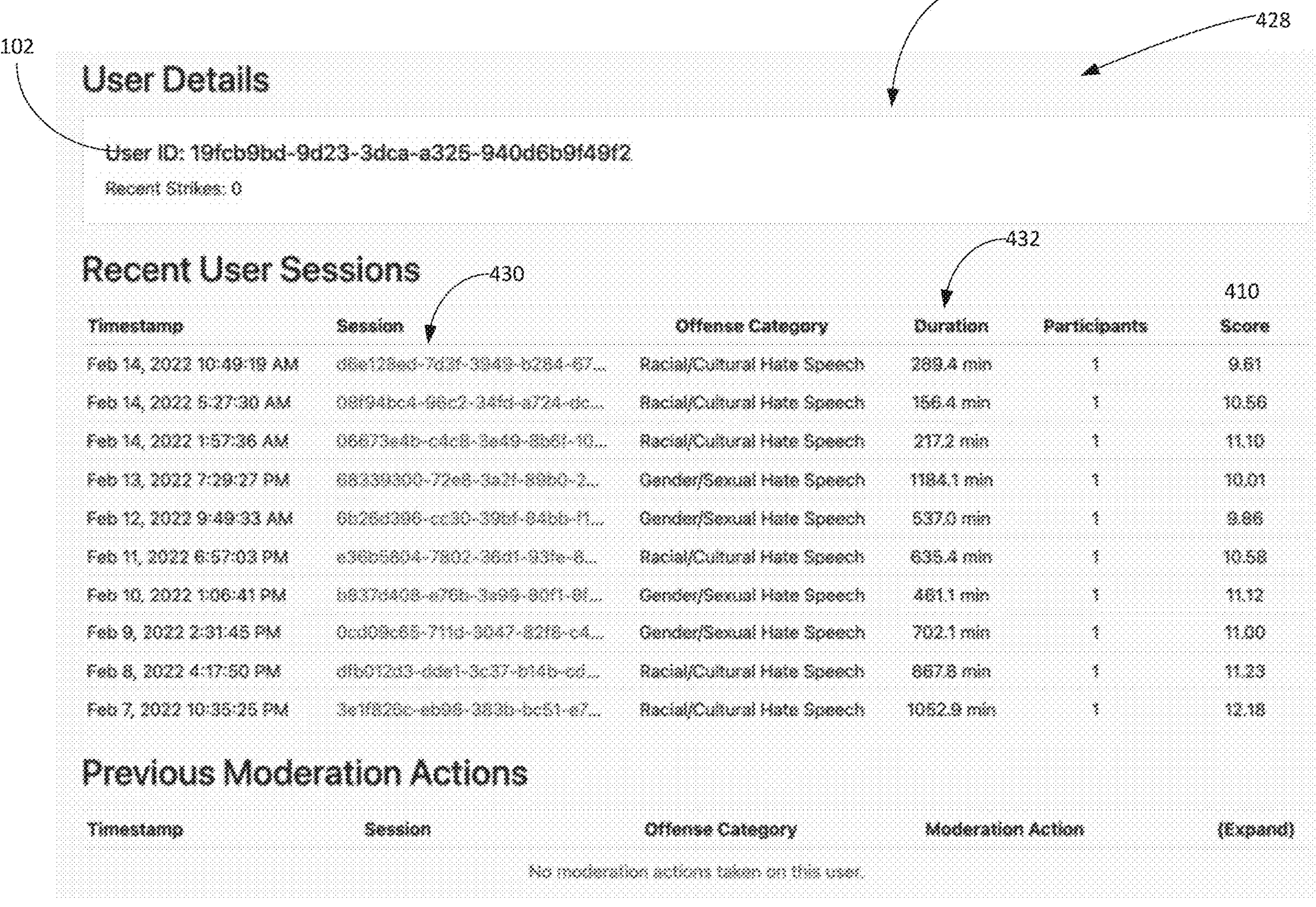
FIG. 9 shows a user details view in accordance with illustrative embodiments of the invention.
Figure 10:
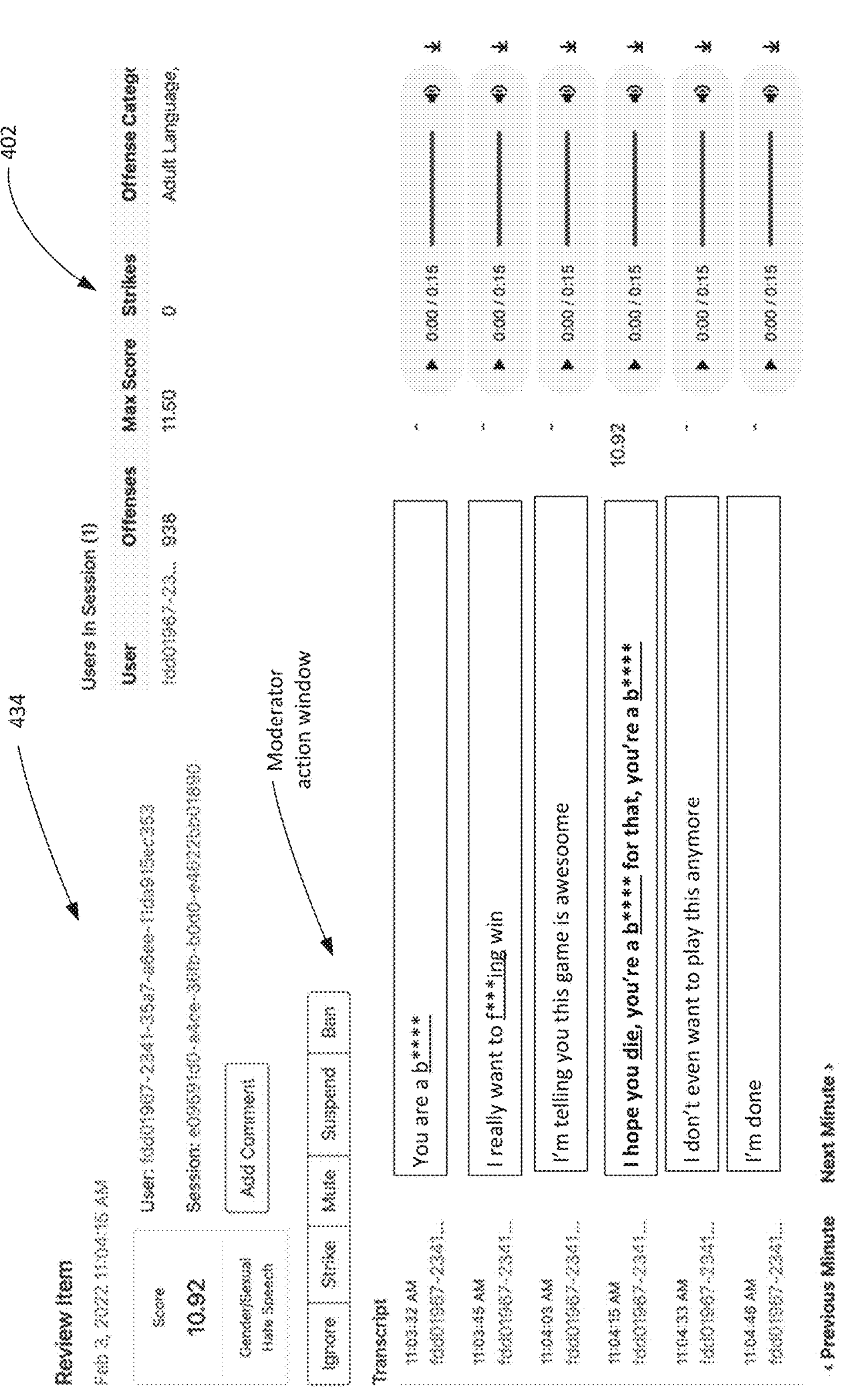
FIG. 10 shows a toxicity item view in accordance with illustrative embodiments of the invention.

Returning to FIG. 4, the moderator 106 may choose to select the user details view by selecting the user 102 identifier. Selecting the user 102 identifier brings up the user detail page 428 in the user interface 402, which is a summary of the user's 102 sessions. FIG. 9 schematically shows the user details display 428. The user detail display 428 shows the recent voice chat sessions 430, the duration 432 of the sessions, and the maximum toxicity score 410 for the sessions The user ID is provided, as well as recent user sessions with a timestamp for the session. Furthermore, this view shows any previous moderation actions, if any. Any of the sessions may be selected and the user interface 402 takes the moderator to the session view 406 for that selected session. FIG. 10 shows a selected session display window or selected session display area (generally referred to as the selected session display 434) in accordance with illustrative embodiments of the invention. The selected session display 434 displays the transcript for the selected toxicity session, as well as the maximum toxicity score 410 for any given toxicity item (e.g., 15 second interval clip). The toxicity item may relate to a single speech clip, or to all of the speech within a particular pre-determined length of time. In some embodiments, the transcript of surrounding speech may be shown for context. Illustrative embodiments provide a moderator action menu that allows action to be taken by the moderator upon review. This action may include ignoring the content, striking the content, muting the player, suspending the player, or banning the player.

Figure 11:
FIG. 11 schematically shows a toxicity moderation timeline in the user interface in accordance with illustrative embodiments.

FIG. 11 schematically shows the user interface 402 having the toxicity moderation timeline 400 in accordance with illustrative embodiments. The timeline 400 includes a plurality of axes 420 that each represent a particular user 102. This is contrast to the timeline 400 shown in FIG. 4, which may have a plurality of users 102 on a single axis. The user interface 402 shows the number of active users 450 in the session (i.e., the number of users who were listeners 104 and/or speakers 102), as well as the number of toxic users 452 in the session. As described previously, the toxic users 102 may be considered "toxic" when the system 100 determines their speech meets a particular toxicity score threshold in accordance with the platform content policy. The platform may set the threshold toxicity score (e.g., score of 7 or above).

As described previously, in a standard voice chat, all users 102 in the session that haven't muted another user can hear each other and may interact with each other. In contrast, two users in separate sessions will not hear each other in real time.

Figure 12:
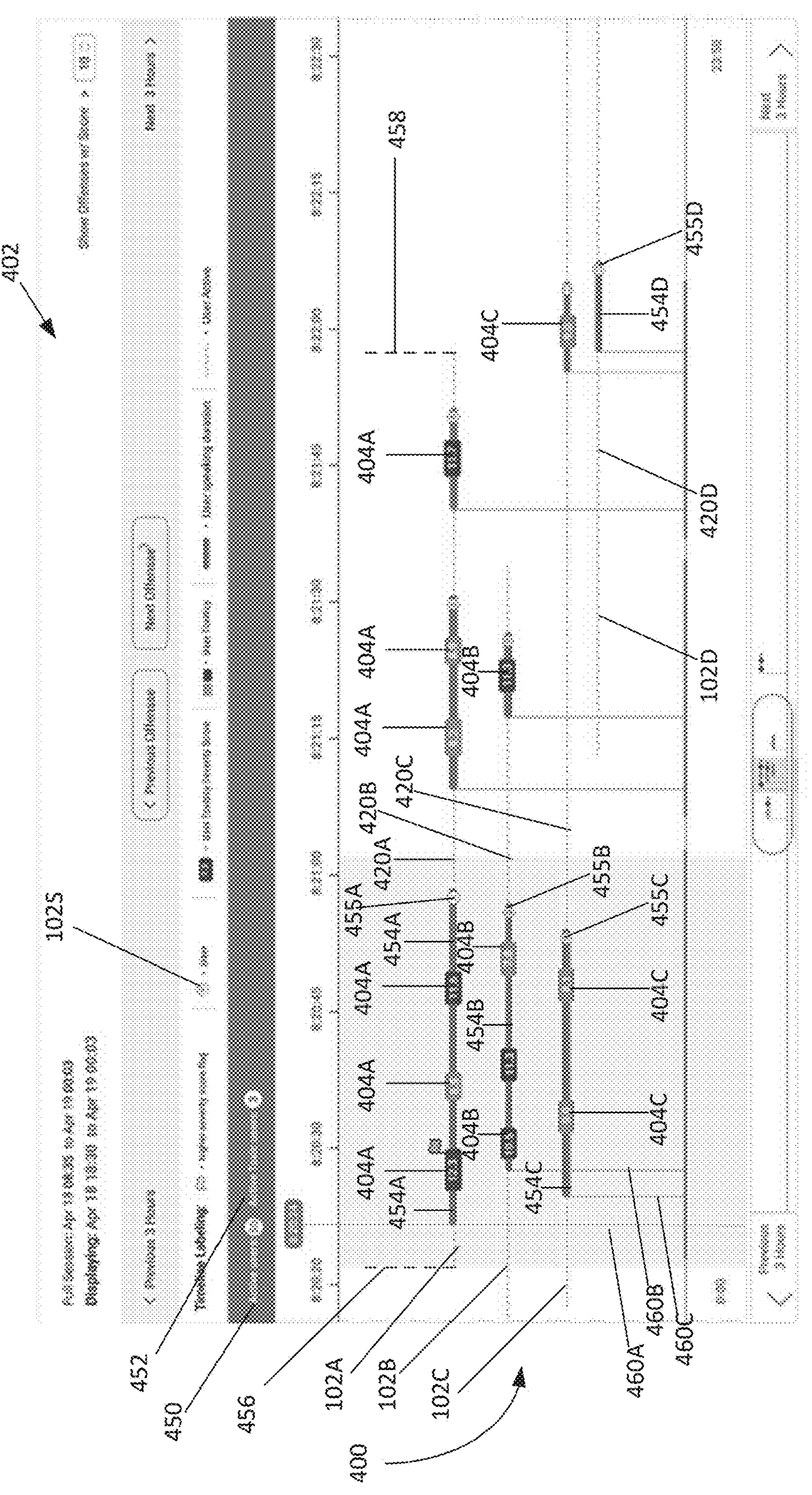
FIG. 12 schematically shows a toxicity moderation timeline in the user interface in accordance with illustrative embodiments.

FIG. 12 schematically shows the user interface 402 having the toxicity moderation timeline 400 in accordance with illustrative embodiments. The timeline display 401 shown in FIG. 12 is particularly advantageous for, among other things, voice chat that incorporates proximity chat. Proximity chat or spatial chat or positional chat is a type of internet chat that overlays voice chat on a virtual world environment, so that users can navigate freely and have conversations among small groups.

To provide additional detail, and as known by those skilled in the art, proximity chat is a type of voice chat that has requirements for each user 102 being able to hear each other. As a basic version, proximity chat may be implemented such that users 102 may communicate with other users 102 that are in virtual proximity relative to one another. For example, if players 102 are in a videogame space with X and Y coordinates, each user 102 may be plotted as a point, and only players within a predetermined virtual distance of each other can hear one another. The requirements for proximity chat may be virtual distance based. For example, proximity chat may be limited to users within 1 virtual meter of each other. If player A is 0.5 virtual meters from person B, they can hear them. However, if person B moves away and is now 1.5 virtual meters away, they can no longer communicate with each other. Of course, those of skill in the art understand that there are many forms of proximity chat.

Illustrative embodiments advantageously allow the moderator 106 to select a given user 102S (e.g., user A in FIG. 12) the entire voice chat session may be seen through that user's 102A perspective. This advantageously allows the moderator 106 to visualize what the selected user 102S heard, which other user 102 could hear the selected user 102S, as well as the interaction between the selected user 102S and other users. This is particular advantageous in proximity chat settings where the user 102S and the groups of people that are interacting are dynamically changing from one moment to the next.

At the session level, a plurality of users 102 cannot all necessarily hear each other. By looking at a single slice of the timeline 400, there may be a plurality of users speaking at the same time (e.g., 10 users), but of that plurality, only a subset may be able to hear each other (e.g., 5 groups of 3 users per group can hear each other). Thus, from the perspective of the moderator 106, there is no contextual relevance from seeing voice communications from users 102 that are not in proximity chat with the selected user 102S. The contextual relevance is within the group of people that can hear each other.

Undesirably, users who are not within the proximity chat for the selected user 102S can create a lot of noise, i.e., irrelevant voice chat information. Illustrative embodiments provide visualizations that allow the moderator 106 to understand why selected user 102S used toxic language, and to visualize the voice-chat that only the selected user 102S could interact with. Thus, continuing the previous example, rather than the moderator 106 having to review voice chat communications from 15 users, the user interface 402 may provide visualizations that prioritize (or only show) communications from the 3 people that were within the proximity chat.

Similar to FIG. 11, the user interface 402 shows the number of active users 450 in the session (i.e., the number of users who were listeners 104 and/or speakers 102), as well as the number of toxic users 452 in the session. Similar to the previous timeline 400 shown in FIG. 4, the timeline 400 provides a visual timeline-based view of toxic users 102A-102C. However, FIG. 12 shows that each toxic participant 102A, 102B, and 102C has a synchronized and independent horizontal time axis 420A, 420B, and 420C, respectively. The timeline 400 may also show speakers 102 who are not toxic (e.g., 102D).

The horizontal user time axis 420 may be represented by a line (e.g., dashed lines). The line may begin 456 at the time the user 102 enters the session (e.g., is sufficiently close to engage in proximity chat, joins the voice communication channel, etc.) and may end 458 when the user 102 leaves the session (e.g., is sufficiently far to disengage from proximity chat, leaves the voice communication channel, etc.). Each user may have their own horizontal time axis 420A-420D. A user indicator 455A-455D may be provided for easy visualization of which user 102A-102D each timeline 420A-420D corresponds to.

Thus, various embodiments advantageously provide a conversation view to the moderator 106 via the user interface 402. To that end, it may be desirable to see a conversation from the point of view of a particular user 102. FIG. 12 shows the point of view of user A 102A. The user interface 402 may automatically position the point-of-view user 102A at the top of the interface. The user interface 402 may then populate users 102 below in the order in which they join the session or based on when they begin speaking.

In proximity chat, the session may include a group of users who are within the proximity and have the possibility to hear each other. The users 102 may interact with each other, but don't necessarily have to. Some embodiments may include users 102 that are not in the proximity chat within the session. However, some embodiments may filter out users that are not in the proximity chat. Furthermore, some embodiments may indicate when users join and/or leave the proximity chat.

Illustrative embodiments advantageously provide a user interface 402 for the moderator 106 to easily visualize a conversation between users 102 that can hear each other. Otherwise, other toxicity is unrelated noise that doesn't provide an understanding of how the conversation developed.

Various embodiments include a speech indicator 454 that indicates when a given speaker 102 is speaking. As can be seen, in FIG. 12, the various speakers 102A-102C are talking simultaneously. When an instance of toxicity occurs, the interface may show the toxicity indicator 404A-404C, e.g., in-line with the speech indicator 454. In the example of FIG. 12, for user 102A, toxicity indicators 404A are provided for predetermined intervals of speech (e.g., 15 seconds) with corresponding toxicity scores. Thus, the toxicity indicator 404A may provide a discrete toxicity score every predefined interval. However, some embodiments may extend the predefined interval to account for a user finishing a word, or shorten the predefined interval if the user stops talking.

In some other embodiments, the toxicity indicator 404A may be provided for a given continual speech segments (e.g., without a pause of more than a second), and a subsequent toxicity indicator 404A may be provided for a second continual speech segment.

In some embodiments, the toxicity indicator 404 may be a vertical indicator (e.g., as shown in FIG. 4). Additionally, or alternatively, and as shown in FIG. 12, the toxicity indicator 404A may include a color and/or a reference to the toxicity score (e.g., for a given 15-second speech clip). The toxicity indicator 404 may function as a heatmap, such that the indicator 404 has a first color (e.g., yellow) to represent potentially toxic speech, a second color (e.g., orange) to represent likely toxic speech of a lower severity, and a third color (e.g., red) to represent likely toxic speech of a higher severity. However, if no toxicity is detected, just the speech indicator 454 is shown (e.g., user 102D does not have any toxicity indicator 404).

Advantageously, the interface 402 allows the moderator 106 to focus on a particular user 102A, and visualize the flow of conversation. This "conversation view" shows the speakers 102A-102C who are participating in the conversation, when they are speaking, when they are being toxic, and how toxic they are being. From the conversation view of FIG. 12, the moderator 106 can determine that the first instance of toxicity in the particular timeline portion is initiated by user 102A (e.g., toxicity indicator 404A with score of 12.3). Shortly thereafter, user 102B provides toxic speech (e.g., toxicity indicator 404B with score of 10.5). User 102C then also provides toxic speech (e.g., toxicity indicator 404C with score of 9.0). At some point later in the conversation, user 102D joins the conversation and provides speech 454D without any toxic content.

Figure 13:
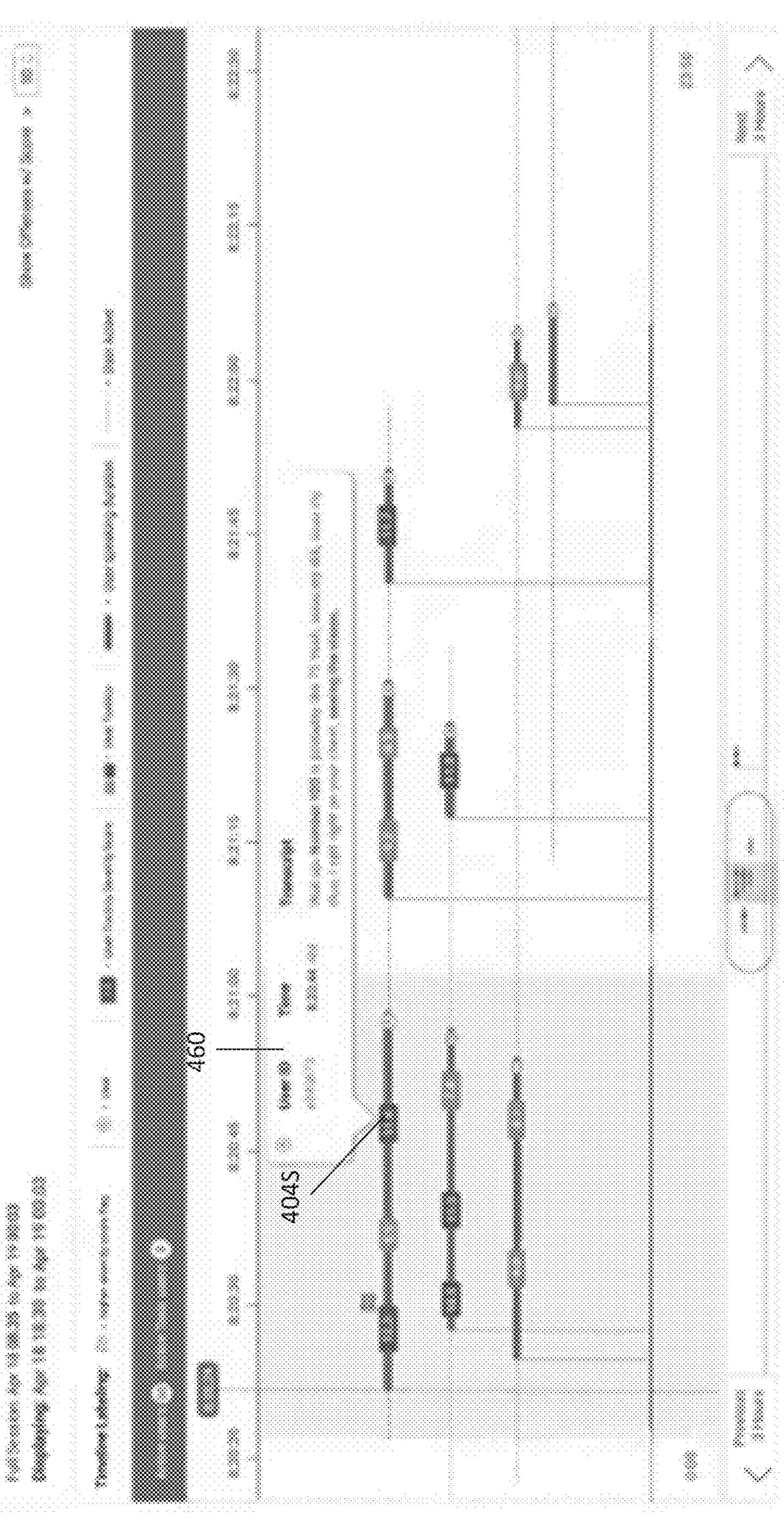
FIG. 13 schematically shows the interface of FIG. 12 when a particular toxicity indicator is selected in accordance with illustrative embodiments.

FIG. 13 schematically shows the interface of FIG. 12 when the moderator 106 selects a particular toxicity indicator 404S. An overlay window 460 is populated in the user interface 402 with information regarding the user ID, the time, and a transcript of the toxic speech.

Figure 14:
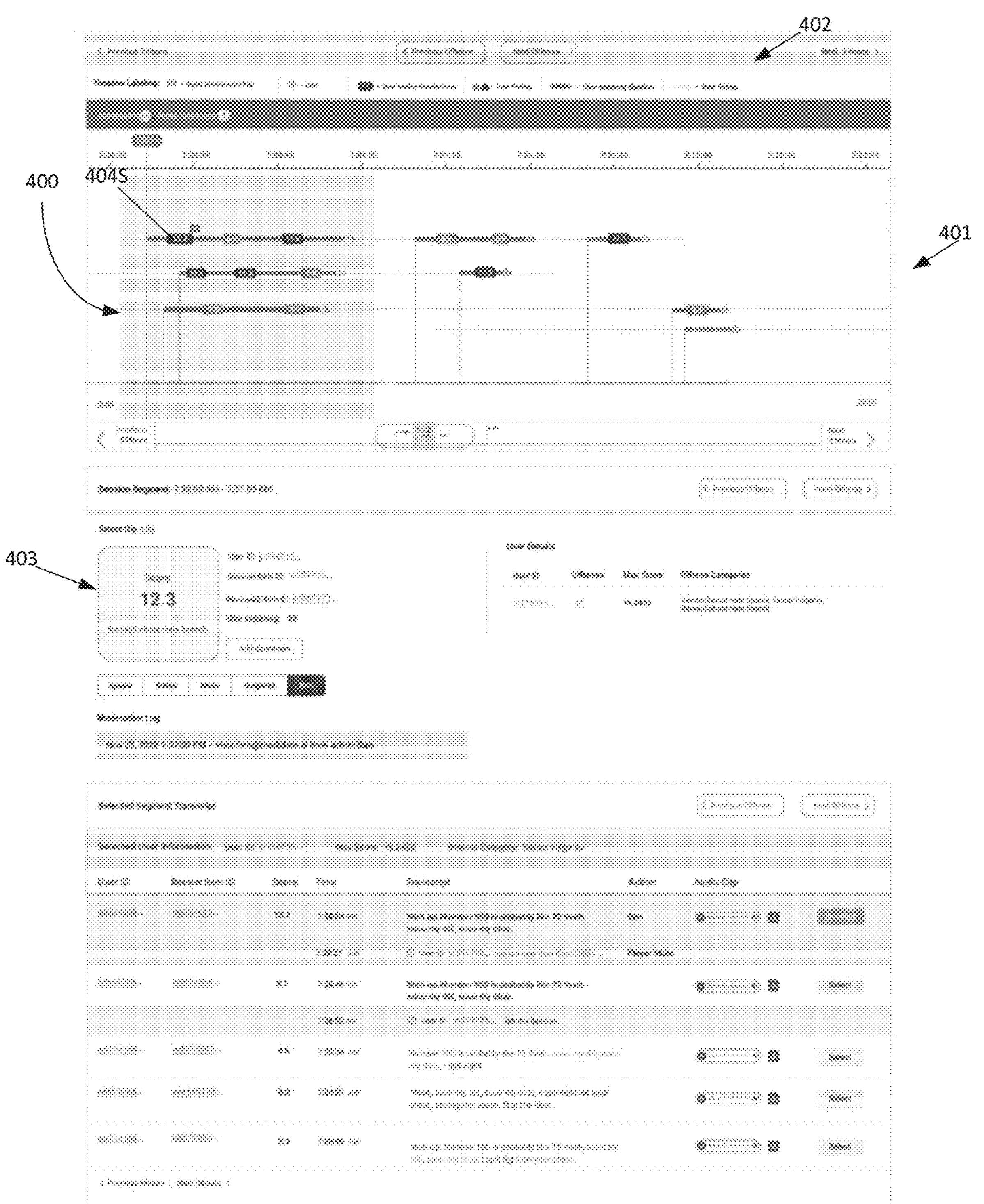
FIG. 14 schematically shows an expanded view of the user interface in accordance with illustrative embodiments.

FIG. 14 schematically shows an expanded view of the user interface 402 in accordance with illustrative embodiments. FIG. 14 the toxicity moderation timeline 400 in accordance with illustrative embodiments of the invention. The user interface 402 includes timeline display 401. By selecting a particular toxicity indicator 404S, the user interface 402 displays a selected segment context window or selected segment display area (generally referred to as the segment context display 401) (e.g., below the timeline display 401). A transcript, timestamp, associated user, and score for the selected segment may be shown. Similarly, other synchronous or near-in-time voice communications may be shown from the users interacting in the chat.

It should be understood that although not repeated, the session view, the user view, as well as accompanying detailed transcript information is visible (e.g., described with reference to FIGS. 4-10) is also available in the user interface 402 described in FIGS. 11-14.

Various embodiments of the invention may be implemented at least in part in any conventional computer programming language. For example, some embodiments may be implemented in a procedural programming language (e.g., "C"), as a visual programming process, or in an object-oriented programming language (e.g., "C++"). Other embodiments of the invention may be implemented as a pre-configured, stand-alone hardware element and/or as preprogrammed hardware elements (e.g., application specific integrated circuits, FPGAs, and digital signal processors), or other related components.

In an alternative embodiment, the disclosed apparatus and methods (e.g., as in any methods, flow charts, or logic flows described above) may be implemented as a computer program product for use with a computer system. Such implementation may include a series of computer instructions fixed either on a tangible, non-transitory, non-transient medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as a tangible, non-transitory semiconductor, magnetic, optical or other memory devices, and may be transmitted using any communications technology, such as optical, infrared, RF/microwave, or other transmission technologies over any appropriate medium, e.g., wired (e.g., wire, coaxial cable, fiber optic cable, etc.) or wireless (e.g., through air or space).

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads. Software systems may be implemented using various architectures such as a monolithic architecture or a microservices architecture.

Illustrative embodiments of the present invention may employ conventional components such as conventional computers (e.g., off-the-shelf PCs, mainframes, microprocessors), conventional programmable logic devices (e.g., off-the shelf FPGAs or PLDs), or conventional hardware components (e.g., off-the-shelf ASICs or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems are necessarily non-conventional because, absent special programming or configuration, the conventional components do not inherently perform the described non-conventional functions.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Various inventive concepts may be embodied as one or more methods, of which examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Although the above discussion discloses various exemplary embodiments of the invention, it should be apparent that those skilled in the art can make various modifications that will achieve some of the advantages of the invention without departing from the true scope of the invention.

What is claimed is:

1. A method for online voice content moderation, the method comprising:

providing a multi-stage voice content analysis system including a communication interface for receiving toxic speech content associated with an online platform, the online platform having a platform content policy, the system including a processor operatively coupled with and in communication with an input, the processor including a first stage circuitry configured to analyze the speech content and categorize the speech content as first-stage positive speech content or first-stage negative speech content, and a pre-moderator stage circuitry in communication with the first stage circuitry, the pre-moderator stage circuitry having a toxicity scorer configured to provide a toxicity score for a given toxic speech content from a first user received by the processor via the input, the toxicity score being a function of a platform content policy;

forwarding, by the first stage circuitry, at least a portion but less than all of the first-stage positive speech content to a pre-moderator stage circuitry, wherein the first-stage positive speech content includes the given toxic speech content;

generating, by the toxicity scorer, the toxicity score for the toxic speech content as a function of the platform content policy;

determining, by the toxicity scorer, that the toxicity score for the toxic speech content, from the first user, meets or exceeds a toxicity score threshold;

automatically banning or muting the first user having the toxicity score for the toxic speech content that meets or exceeds the toxicity score threshold; and providing the toxic speech content to a human moderator as a function of the toxicity score.

2. The method of claim 1, further comprising:

receiving, by the toxicity scorer, feedback from the human moderator regarding whether the toxic speech content is considered to be toxic based on the content policy.

3. The method of claim 1, further comprising:

setting, by the toxicity scorer, the toxicity score threshold for automatic moderator action.

4. The method of claim 3, further comprising:

providing, by the processor, a subset of the toxic speech content to the human moderator as a function of the toxicity score, wherein the subset of the toxic speech content has an associated toxicity score below the threshold toxicity score for a second user.

5. The method of claim 4, further comprising:

updating, by the toxicity scorer, the toxicity score for the subset of the toxic speech content as a function of the received feedback from the human moderator;

determining, by the processor, an accuracy of the subset of the toxic speech content; and adjusting, by the toxicity scorer, a toxicity score threshold for automatic moderator action, wherein adjusting reduces the toxicity score threshold.

6. The method of claim 1, wherein a machine learning system is trained to generate a toxicity score using a toxicity score dataset.

7. The method of claim 6, wherein the toxicity score dataset includes an adult language component, an audio assault component, a violent speech component, a racial hate speech component, and a gender hate speech component.

8. The method of claim 7, wherein the toxicity score is provided for each individual component of a speech clip.

9. The method of claim 7, wherein the toxicity score is provided as an overall toxicity score for a speech clip.

10. The method of claim 6, wherein the toxicity score dataset includes an emotion component, a user context component, and an age component.

11. A multi-stage content analysis system comprising:

a first stage circuitry trained using a database operatively coupled with the first stage circuitry having training data with positive or negative examples of training content for the first stage engine, the first stage circuitry configured to:

receive speech content from an input, analyze the speech content to categorize the speech content as having first-stage positive speech content or first-stage negative speech content;

a pre-moderator stage circuitry in communication with the first stage engine configured to analyze at least a portion, but less than all, of the first-stage negative speech content, the pre-moderator stage circuitry further configured to analyze at least a portion of the first-stage positive speech content to categorize the first-stage positive speech content as having pre-moderator-stage positive speech content or pre-moderator-stage negative speech content, the pre-moderator stage circuitry operatively coupled with the database and further configured to update the database using the pre-moderator-stage positive speech content or the pre-moderator-stage negative speech content, the pre-moderator stage circuitry including a toxicity scorer configured to provide a toxicity score for the pre-moderator-stage positive speech content, determine, for a first user, if the toxicity score the toxic speech content meets or exceeds a toxicity score threshold, and automatically reduce an audio exposure of a second user to the first user if the toxicity score for the toxic speech content of the first user meets or exceeds the toxicity score threshold; and a user interface operatively coupled with the pre-moderator stage circuitry, the user interface configured to display the toxicity score for the pre-moderator-stage positive speech content as a function of the toxicity score.

12. The system as defined by claim 11, further comprising an automatic action threshold setter configured to set a toxicity score threshold above which toxic speech content is automatically moderated.

13. The system as defined by claim 12, further comprising an input configured to receive feedback from a human moderator, the feedback indicating whether the pre-moderator-stage positive speech content is toxic or not.

14. The system as defined by claim 11, wherein the pre-moderator stage circuitry is configured to provide pre-moderator-stage positive speech content to the human moderator that is below the toxicity score threshold.

15. The system as defined by claim 14, wherein the automatic action threshold setter is configured to adjust the toxicity score threshold as a function of the accuracy of the toxicity scores after the pre-moderator stage circuitry training is updated using feedback received from the human moderator.

* * * * *